(12) United States Patent
Plaia et al.

(10) Patent No.: US 7,996,195 B1
(45) Date of Patent: Aug. 9, 2011

(54) COMPUTATION OF PARTICLE ENERGY FROM ABLATION

(75) Inventors: Joseph M. Plaia, Fredericksburg, VA (US); Luis C. Gominho, Fredericksburg, VA (US); Keith M. DeLoach, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 420 days.

(21) Appl. No.: 12/286,284

(22) Filed: Sep. 24, 2008

(51) Int. Cl.
  *G06G 7/48* (2006.01)
  *G06G 7/56* (2006.01)
(52) U.S. Cl. ............... 703/5; 703/2; 703/10; 345/420; 434/126
(58) Field of Classification Search .............. 703/5
  See application file for complete search history.

(56) References Cited

U.S. PATENT DOCUMENTS

| 7,024,342 B1 | 4/2006 | Waite et al. ............... 703/6 |
| 7,207,520 B2 | 4/2007 | Lundy et al. ............... 244/53 |

OTHER PUBLICATIONS

Xianghui Chen et el., "Application and experimental validation of a computational fluid dynamics (CFD)-based erosion prediction model in elbows and plugged tees", 2004, Science Direct, Computers & Fluids No. 33, pp. 1251-1272).*
David Knight et al., "Visualizing Unstructured Flow Data Using Dual Stream Functions", 1996, IEEE Transactions on Visualization and Computer Graphics, vol. 2, No. 4, pp. 355-363.*
J. Li et al., "A computational investigation of transient heat transfer in pneumatic transport of granular particles", 2000, Powder Technology, No. 112, pp. 273-282.*
Jonathan M. Burt et el., "Extension of a Multiscale Particle Scheme to Near-Equilibrium Viscous Flows", Jun. 2009 (first briefed on Jun. 2008), AIAA Journal, vol. 47, No. 6, pp. 1507-1517.*
Ai-Bing Yu et al, "Discrete Element Simulation for Pneumatic Conveying of Granular Material", Sep. 2005, AIChE Journal, 2006, vol. 52, No. 2, pp. 496-509.*
Kuanmin Moa et al, "DEM simulation of particle damping", 2004, Powder Technology, No. 142, pp. 154-165.*
Yongzhi Zhao et al, "Numerical simulation of two-dimensional spouted bed with drift plates by discrete element method", Mar. 2008, pp. 5-9.*
Brahmagupta's Formula (Wolfram MathWorld) http://mathworld.wolfram.com/BrahmaguptasFormula.html.

(Continued)

*Primary Examiner* — Kamini S Shah
*Assistant Examiner* — Randall Shaffer
(74) *Attorney, Agent, or Firm* — Gerhard W. Thielman, Esq

(57) ABSTRACT

A method is provided for predicting thermal energy transfer from an entrained particle to a wall surface, the entrained particle being incorporated within a computational fluid dynamics (CFD) model of a flow scenario. Initially, the method generates grid geometry for the CFD model to form a plurality of finite element cells; and establishes initial and boundary conditions for the flow scenario. The model determines a characteristic particle size of the entrained particle; inserts the particle into a cell at an initial location; initializes physical conditions of the particle as a particle state; and calculates a time-step based on characteristic cell size and flow velocity. The model integrates state change in the particle state over the time-step in the cell; and computes collision effect in response to the particle crossing a face of the cell. After convergence, the model quantifies energy flux to the wall surface from impingement by the particle.

6 Claims, 12 Drawing Sheets
(2 of 12 Drawing Sheet(s) Filed in Color)

OTHER PUBLICATIONS

R. Hermsen, "Aluminum Oxide Particle Size for Solid Rocket Motor Performance Prediction", *J. of Spacecraft and Rockets* (1981), v. 18, 483-490.

S. P. Timoshenko & N. J. Goddier, *Theory of Elasticity 3/e* (1934), 420.

L. C. Gómez & F. E. Milioli, "Numerical Simulation of Fluid Flow in CFB Risers—A Turbulence Analysis Approach", *J. of the Braz. Soc. of Mech. Sci & Eng.* (2005), v. 27, No. 2, 141-149.

H. U. Kang et al., "Effect of particle migration on the heat transfer of nanofluid", *Korea-Australia Rheology J.* (2007), v. 19, No. 3, 99-107.

K. Nomura et al., "Numerical Anslysis of Droplet Breakup Behavior using Particle Method", *J. of Nuclear Science and Nanotechnology* (2005), v. 38, No. 12, 1057-1064.

C. Crowe et al., *Multiphase Flow with Droplets and Particles* (1998), 43-47, 76, 102-103, 114-121.

F. P. Incropera & D. P. DeWitt, *Fundamentals of Heat and Mass Transfer 3/e* (1990), 259-263.

CRAFT CFD® *User's Manual* version 2.06 (2006), 126.

* cited by examiner

```
!This is the input file for the particle tracking Code
!Any line with a ! at the beginning is a comment                    300
!All key words must be in all caps
!True or false must be either all caps or all lower case
!Units need to be consistent.  No conversions are done in code.
!
!================================================================
!---CFD Solution Formats---
!dimension of grid
DIMTYPE 3 !1=2D planar, 2=2d axisymm., 3=3D
!
GRIDFORM                                                        ⎫
!type   unformatted iblank  multi-block    !for plot3D files    ⎬ 310
plot3d  true       true     true                                ⎭
GNAME recomp.craft.gr0
!
QFORM                                                           ⎫
!type      unformatted iblank  multi-block !for plot3D files    ⎬ 315
plot3d-fun true        true    true                             ⎭
QNAME recomp.craft.gfun
!
!cfd boundary condition file (nparc or craft format)            ⎫
BCFORM craft                                                    ⎬ 320
BCNAME craft.global                                             ⎭
!
!================================================================
!---Values for dimensionalizing grid and solution               ⎫
XLINF 1.0  !length scale                                        ⎪
!if solution values are dimensional enter 1.0                   ⎬ 330
RHOINF 1.17156                                                  ⎪
UINF 347.97                                                     ⎪
PINF 101325.0                                                   ⎭
!
!================================================================
!---File names for output---                                    ⎫
!Write original solution data (true/false and filename)         ⎪
FCFD false tec_cfd.plt                                          ⎪
!Time dependent solution data                                   ⎬ 340
FOUTU final_out.plt                                             ⎪
!Final wall data                                                ⎪
FWALLS wall.plt                                                 ⎭
!
!================================================================
```

FIG. 3A

```
!---Settings for running the Code
CFD_Solution_Values
!Position in data file of each variable (ignored for q files)
!rho uvel vvel wvel P(Pa) T(K) Mach gamma cp(J/(kg K) mu(N/(s m^2)) Pr
  1    2    3    4    5     6    7   avg     avg           8         avg
Average_CFD_Values !if nodal values are not in CFD solution
!rho uvel vvel wvel P(Pa) T(K) Mach gamma cp(J/(kg K)  mu(N/(s m^2)) Pr
 0.   0.   0.   0.   0.    0.   0.  1.159   2221.2       1.e-9       0.72
!Gravity vector
GVEC 0. 9.81 0.
!
!==============================================================
!---Particle/Wall Information
FFAC 0.2 wall friction factor
CRES 0.8 coefficient of restitution
!
!==============================================================
!---Particle data
 PDENS 3970.  kg/m^3
 PCOND 6.0 W/(m*K)
 PCP 765 J/(Kg*K)
 PDMEAN 3.338e-6 4.18e-6 meters mean particle diameter 4.5e-6
 PSTDEV 0.3
 NPGROUP 5   number of particle groups
 MdotAL 8.329e-3  kg/s   mass flow rate of AL2O3 particles (user accounts for
axisymmetric cases)
!
!==============================================================
!---Particle insertion info
!Insert particles using a PATCH defined below or using BC file
PATCH false
!If (PATCH==FALSE), enter boundary condition for particle input
PBC -5
!If (PATCH==TRUE), define particle insertion patch here
!       block# imin, imax, jmin, jmax, kmin, kmax (node-centered)
PLOCS    1      1     1     1    10    1     2
!number of particles along major and minor axes
PNUMS 10 20
!Equate particle props to local flow (true) or user input (false)
PEQUATE true
!Initial particle velocity vector (if PEQUATE==false)
PVINIT 0. -34. 0.
PTINIT 300.
!
!==============================================================
!---Time Step Information
!time step size in s (this may be set within code as cfl)
DT 1.e-6
!Maximum time of run
TEND 5.
!interval to output particle positions
DTPRINT 1.e-5
```

FIG. 3B

| Data Array Position | Variable 420 |
|---|---|
| 1 | $\rho$, density |
| 2 | $U$, velocity |
| 3 | $V$, velocity |
| 4 | $W$, velocity |
| 5 | $P$, pressure |
| 6 | $T$, temperature |
| 7 | $M$, Mach number |
| 8 | $\gamma$, ratio of specific heats |
| 9 | $Cp$, constant pressure specific heat |
| 10 | $\mu$, viscosity |
| 11 | $\kappa$, conductivity |

CFD SOLUTION VARIABLES NEEDED FOR PISCES AND THEIR POSITIONS IN THE PISCES DATA ARRAY 400

| 700 | | | | | |
|---|---|---|---|---|---|
| DEFINITION OF CELL NODES AND EDGES ASSOCIATED WITH EACH CELL FACE AND TRIANGLE | | | | | |
| 710 Face | 720 Direction | 730 Triangle | 740 Vertices | 750 Edges | |
| 1 | x− | 1 | 5, 8, 1 | 5, 9 | |
| | | 2 | 4, 1, 8 | 1, 12 | |
| 2 | x+ | 1 | 6, 7, 2 | 7, 10 | |
| | | 2 | 3, 2, 7 | 3, 11 | 760 |
| 3 | z− | 1 | 2, 1, 3 | 2, 3 | |
| | | 2 | 4, 3, 1 | 4, 1 | |
| 4 | z+ | 1 | 6, 7, 5 | 7, 6 | |
| | | 2 | 8, 5, 7 | 5, 8 | |
| 5 | y− | 1 | 5, 1, 6 | 9, 6 | |
| | | 2 | 2, 6, 1 | 10, 2 | |
| 6 | y+ | 1 | 8, 7, 4 | 8, 12 | |
| | | 2 | 3, 4, 7 | 4, 11 | |

COMPUTATION OF PARTICLE ENERGY FROM ABLATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to computing energy transfer from particles to a surface, thereby causing ablation. In particular, numerical methods for augment heat transfer from flow-fields to wall surfaces by accounting for particle collision kinetic and thermal effects against the surface.

The United States Navy employs ablative materials missile launching systems to protect the surfaces of the launcher structure, with the Mk 41 Vertical Launching System (VLS) representing one such example contained aboard a combat vessel as its platform. Several missiles are contained within the VLS for selective launching, each by its rocket motor booster. Upon igniting a rocket motor within a VLS canister, high-temperature exhaust, often containing aluminum oxide ($Al_2O_3$) particles, flows through the gas management system and over ablative materials that cover protected surfaces. The ablative material chars and/or erodes as the launcher surfaces absorb energy from the exhaust gas and particles. The erosion protects the launcher structure by decreasing the amount of heat transferred through the ablative to the underlying structures.

The energy imparted to the ablative wall may come from convection from the gas or from particle effects. Particles may impart energy to the walls from conduction and solidification during impacts and from abrasion due to repeated particle impacts. The extent of the ablative erosion depends on the type of rocket launched and the duration of time the missile remains within the canister. The most significant erosion occurs during a restrained firing, when the rocket motor is ignited but the missile cannot exit the canister.

Analytical, experimental, and computational methods have been used to predict the amount of erosion that occur during a rocket launch or restrained firing, and these prediction methods have provided valuable information regarding ablation erosion for launcher designs. However, large errors can result from comparisons between predictions and measured erosion data. There have also been a few occurrences of the rocket exhaust eroding through all the ablative material and burning through the launcher structure. Improved computational methods to predict the extent of ablative erosion would allow for improved safety and reliability of U.S. Navy missile launching systems. The code described in this report is an attempt to improve prediction capabilities.

Naval Surface Warfare Center, Dahlgren Division (NSWCDD) has been involved in predicting VLS ablation for many years. See C. T. Boyer, J. W. Powers, T. R. Burgess, J. R. Bowen and K. R. Stull, "High-Strength Quartz Reinforcement for Mk 41 Vertical Launching System Ablators", NSWCDD/TR-95/224, Naval Surface Warfare Center, Dahlgren Division, 1996. The conventional method for predicting erosion requires both experimental and computational results. Conventional techniques provide a computational fluid dynamics (CFD) analysis of the gas dynamics within the VLS plenum and uptake.

Although the rocket exhaust may have $Al_2O_3$ particles, the CFD analysis does not include the particle motion within the gas flow. Computational power has not been sufficient to produce a coupled particle-gas CFD solution in a reasonable amount of time. To account for the added mass of the particles within the flow, the exhaust gas is modeled as a "heavy" gas. The heavy gas is a mixture of the gaseous exhaust products and $Al_2O_3$ with the proportions set to provide the correct total exhaust mass flow rate. This heavy gas is conventionally used to provide a simulation flow field within the launcher.

Using the conventional CFD results, a computational heat flux from the hot gas to the launcher walls is estimated. In order to accurately compute a heat flux using CFD, the boundary layer must be fully resolved. For geometries of the scale and complexity of the VLS, using a grid this fine typically requires prohibitively long run times for the CFD solution. Therefore, the heat flux is computed from gas properties taken at a "standoff" distance from the wall.

Next, an empirical relation is used to scale the computational heat flux. The empirical relation was derived from erosion measurements obtained from a set of experiments designed to investigate the performance of different ablative materials. The scaled heat flux is then used in a one-dimensional heat conduction code to compute the steady-state wall ablation rate. The total wall ablation is applied as the steady-state ablation rate multiplied by the total burn time of the rocket motor. Errors in this conventional predicted ablation may be on the order of several hundred percent.

SUMMARY

Conventional CFD models yield disadvantages regarding incorporation of particle impingement that are addressed by various exemplary embodiments of the present invention. In particular, various exemplary embodiments provide a method for predicting thermal energy transfer from an entrained particle to a wall surface, said entrained particle being incorporated within a CFD model of a flow scenario.

Initially, the method generates grid geometry for the CFD model to form a plurality of finite element cells; and establishes initial and boundary conditions for the flow scenario within the model. Continuing, the model determines a characteristic particle size of the entrained particle; inserts the particle into a cell at an initial location; initializes physical conditions of the particle as a particle state; and calculates a time-step based on the flow velocity and a characteristic cell size determined from the computational grid.

The model proceeds to integrate state change in the particle state over the time-step in the cell; and compute collision effect from the particle to the wall surface in response to the particle crossing a face of the cell if the face constitutes the wall surface. Otherwise the method locates the particle either in an adjacent cell in response to the particle crossing the face, or else in the cell; and updates the particle state with the state change for end of the time-step in response to the particle remaining in the cell. The method iterates by repeating the integrating through updating operations with the adjacent cell being assigned as the (original) cell in response to the particle crossing the face until reaching end of the grid geometry. After convergence, the model quantifies energy flux to the wall surface from impingement by the particle on the wall surface.

BRIEF DESCRIPTION OF THE DRAWINGS

The patent or application file contains at least one drawing executed in color. Copies of this patent or patent application publication with color drawings will be provided by the office upon request and payments of the necessary fee.

These and various other features and aspects of various exemplary embodiments will be readily understood with reference to the following detailed description taken in conjunction with the accompanying drawings, in which like or similar numbers are used throughout, and in which:

FIGS. 3A and 3B are input instructions as input to the particle interaction code;

FIG. 14 is an elevation view of a color contour plot for gas velocities;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Recently, several tests of rocket motor burns have exhibited more erosion than was predicted, challenging the accuracy of the predictions. This has caused interest in improving the predictive capabilities. From examining prediction methodologies used by other organizations, the selected option for improving predictive abilities is to include the particle effects in the numerical simulations. These particles, such as those released from combustion of solid rocket propellant, are entrained within the exhaust gases produced to drive forward a missile onto which the motor attaches. These particles in the rocket plume can contact an elastic surface (e.g., wall), such, as on a launch canister. Such impacts can transfer thermal energy from a hot particle to a cold wall, as well as cause abrasion to the latter. Both of these effects can cause higher wall erosion than predicted from the gaseous medium alone. Modeling these effects constitutes a serious challenge in numerical heat transfer modeling.

I. Ablation Model Overview: The Particle Integration Scheme for Computing Energy to Surfaces (PISCES) computer program has been developed to include particle effects with the erosion predictions and disclosed herein. This computer model predicts the particle impact locations and the energy imparted to the ablative surfaces from the impacts. The energy flux to the walls can be used to develop correlations for predicting ablation.

Various exemplary embodiments provide a model that uses a pre-computed computational fluid dynamics solution of the fluid flow through the launcher system. The code reads this solution, inserts representative particles of the correct mass, and tracks their motion through the system. The particles are "one-way coupled" that means the computed fluid motion affects the particle motion, but the particle effects are not used to adjust the fluid flow. This is a simplification to render the computational problem tractable. The code predicts the total energy flux to the walls due to particle actions. The total energy flux includes both the kinetic component from particle impacts and the conduction component from heat conduction while a particle is in contact with the wall. The total flux is then used to predict the extent of the wall ablation.

Figure 1:
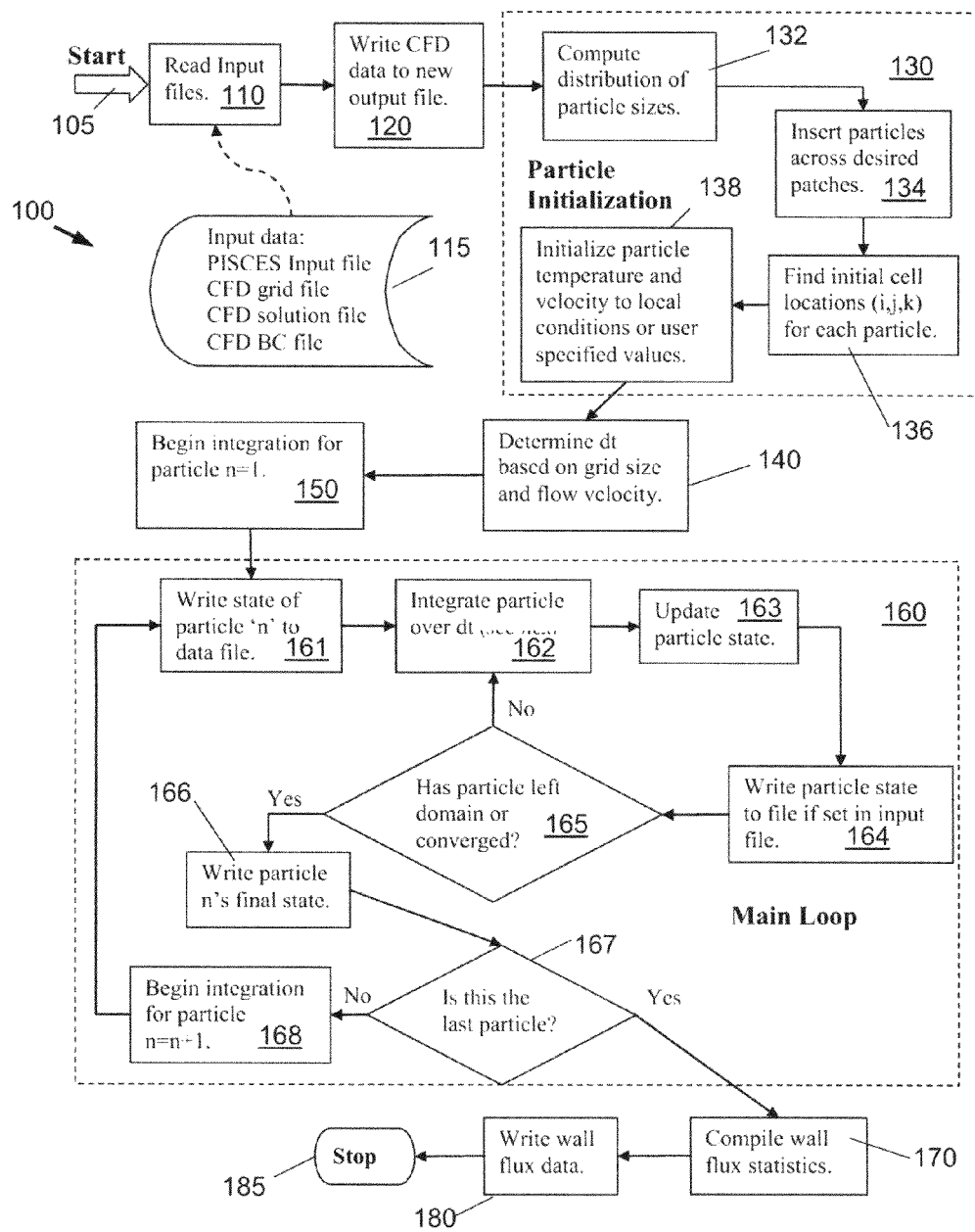
FIG. 1 is a block diagram view of a logical flowchart for computing particle heat transfer to a wall.
Figure 2:
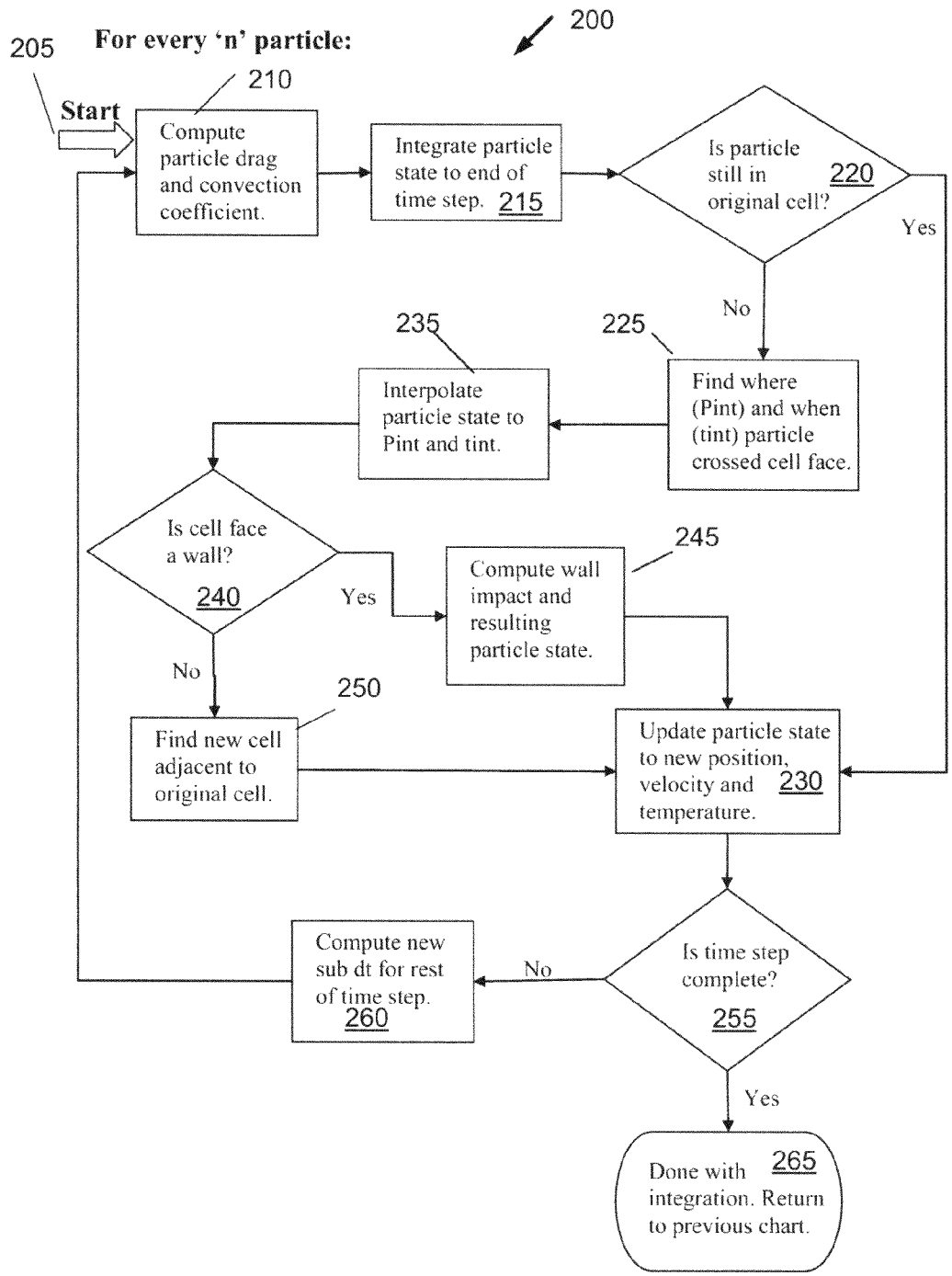
FIG. 2 is a block diagram view of a logical flowchart for a particle integration subroutine.

II. Code Structure and General Operation: FIGS. 1 and 2 present flowcharts respectively illustrating the general operation of the prediction code and particle time integration. The main steps include reading the input files, initializing the particles, looping over each particle for time integration, and writing the final data as output. Each step in the chart is described in detail in later sections. FIG. 1 illustrates a first flowchart diagram 100. The program initiates at step 105 by reading input files at step 110. These input files 115 include data for parameter input, grid, solution and boundary conditions. The CFD data are written to a new output file at step 120. The program proceeds to particle initialization 130, which computes distribution of particle sizes at step 132, inserts particles across desired patches 134, finds initial grid cell locations (i, j, k) for each particle at step 136 and initializes physical conditions (in dimensioned units) at step 138.

The program proceeds to determine time-step dt based on grid size and flow velocity at step 140. The program begins integration for the particles, initially from n=1 at step 150 and proceeds to the main loop 160. This particle integrator writes the state of a particle n to a data file at step 161 and then integrates the particle over the time-step (as explained in FIG. 2) at step 162. The particle state is updated in step 163 and written to a file if initially set as input in step 164. A logical test at step 165 determines whether the particle has left the domain or converged. If so, the program proceeds to write the particle's final state at step 166, but otherwise returns to step 162. After final state writing, another logical test at step 167 determines whether n represents the last particle. If not, the sequence updates to n=n+1 at step 168 and returns to step 161. Otherwise, the program continues to compile wall flux statistics at step 170, followed by writing the wall flux data at step 180, after which the program terminates at step 185.

III. Particle Time Integration: FIG. 2 illustrates a second flowchart diagram 200 to further describe step 162 as a subroutine. For every n particle, the program starts at step 205 and proceeds to compute particle drag and convection coefficient at step 210. The program integrates particle state to the end of the time-step at step 215. A first logical query determines whether the particle remains in the original cell at step 220. If not, point position and time corresponding to the particle crossing the cell face are determined at step 225. Otherwise, the particle state is updated (within the original cell) regarding position, velocity and temperature at step 230.

From step 225, the program continues to interpolate the particle state to position and time at step 235. A second query at step 240 inquires whether the cell face represents a wall. If so, the program computes wall collision (i.e., impact) and the resulting particle state at step 245. Otherwise, the program proceeds to find a new cell adjacent to the original cell at step 250. Then (from either of steps 245 or 250) the program proceeds to step 230 and continues to a third logical query at step 255 to determine whether the time-step is complete. If not, the program calculates a new sub-time-step for the remainder of the time-step at step 260 and returns to step 210. Otherwise, the program returns to step 163 and concludes this subroutine.

IV. Input Files: The particle code may receive input from four or five separate data files. These files provide the user-specified options, the computational domain, the boundary conditions, and the initial conditions. The details and options for reading each of the input files are discussed below. The necessary inputs are:

(1) The main input file where user options are set;
(2) The computational grid used for the CFD analysis;
(3) The boundary conditions applicable for the CFD analysis; and
(4) The pre-computed CFD solution (this may be one or two files).

V. Main Input File: The main input file to control the run is the file "PiscesInput.dat", which provides a fully commented text-based file. Any line beginning with an "!" denotes a comment. The input options may be divided into separate sections to deal with different aspects of the code. There are sections to specify the input and output file names, the data formats and the particle insertion parameters, material, and impact behavior. The input options may be set by specifying a key word, in all capital letters, followed by the user-desired value. For example, to specify the friction factor for particle-wall interactions, the data file-contains the lines:

!Friction factor for particle-wall interactions
FFAC 0.2 where FFAC identifies a friction coefficient $C_f$ having a value of 0.2.

FIGS. 3A and 3B illustrate an example of such an input file 300 for PiscesInput.dat. Each section of the example input file indicates the corresponding segment regarding the possible entries. FIG. 3A shows CFD solution formats for grid-form as segment 310, function format as segment 315 and boundary condition as segment 320. Units for dimensioning and solution scales are input in segment 330. File names for output data are identified in segment 340. FIG. 3B shows CFD solution values in segment 350. Information for particle and wall interaction is provided in segment 360. Particle data are identified in segment 370. Particle insertion in a grid cell is presented in segment 380. Finally, time-step information is provided in segment 390.

VI. Reading the Grid: Currently, PISCES can only use a structured CFD grid. The grid may be two-dimensional planar, two-dimensional axisymmetric, or three-dimensional. The options for reading the grid are set within the main input file 300. While other grid formats may be added in the future, the type of grid file currently used is in PLOT3D format. There are several options available for PLOT3D files. They may be formatted or unformatted, and i-blanked or non-i-blanked. These options are available by setting the appropriate flag in the input file. The following lines in segment 310 are from the input file.

| GRIDFORM | | | | |
|---|---|---|---|---|
| !type | unformatted | iblank | multi-block | !for plot3D files |
| plot3d | true | true | true | |
| GNAME recomp.craft.gr0 | | | | |

Grid format options may be set by setting entering "true" or "false." In the example presented, the grid is a plot3d, unformatted, i-blanked, multi-block grid, and the filename is "recomp.craft.gr0" input to GNAME. After reading the nodal positions, the grid is dimensionalized using the user-specified factor. If dimensioning is not required for any parameters, the input XLINF equals 1.0 as in:

XLINF 1.0 as a default length scale to thereby specify non-dimensional physical input parameters.

VII. Reading the Boundary Conditions: The boundary conditions for the CFD solution must also be read by PISCES in segment 320. The CFD boundary conditions specify whether the boundaries of computational blocks are walls, block-to-block boundaries, inflows, outflows, or reflective boundaries. PISCES may read boundary condition files in the formats from CRAFT and NPARC (developed by NASA Lewis and Arnold Engineering Development Center). Other formats may be added as needed for reading CFD solutions from other structured codes. The input file lines dealing with reading the boundary condition file are:

!cfd boundary condition file (nparc or craft format)
BCFORM craft
BCNAME craft.global where BCFORM may be either "craft" or "nparc" format and the filename is entered after BCNAME input.

PISCES reads the boundary conditions and saves the values in internal arrays for reference during the particle motion integration. Each boundary can be saved in the multi-dimensional array "bc" as labeled. The array bc is dimensioned as:

Bc(nblock, direction, bc#, 8)

where nblock is the block number for the boundary and the direction is either i, j, or k. The boundary condition number, "bc#", simply numbers the boundary conditions for each block and direction incrementally starting at one. The "8" refers to the eight values saved for each boundary condition. The values are:

1=imin
2=imax
3=jmin
4=jmax
5=kmin
6=kmax
7=boundary condition value (e.g., −5 is an inlet)
8=extra value if needed.

The dimensions are saved in cell-centered dimensions. Block-to-block boundaries are read from the boundary condition file and saved in a "bpatch" array. The bpatch saves the boundary number of matching boundary conditions so, when a particle passes through one block-to-block boundary, the program can find the boundary of the matching face and determine into which block the particle moved. Finally, wall definitions are saved in a "walldef" array. Particle-wall impacts use the walldef array to save the collision information for later processing.

VIII. Reading the CFD Solution: The pre-computed CFD solution may be read using PLOT3D format. PLOT3D solution files may be in the form of a q-file or a function file. Other solution formats may be added as needed. Eleven CFD variables are required for all PISCES calculations. These eleven variables may be read from the CFD solution for each cell or, if not available in the CFD solution, the user may specify an average value throughout the domain.

Figures 4, 5:
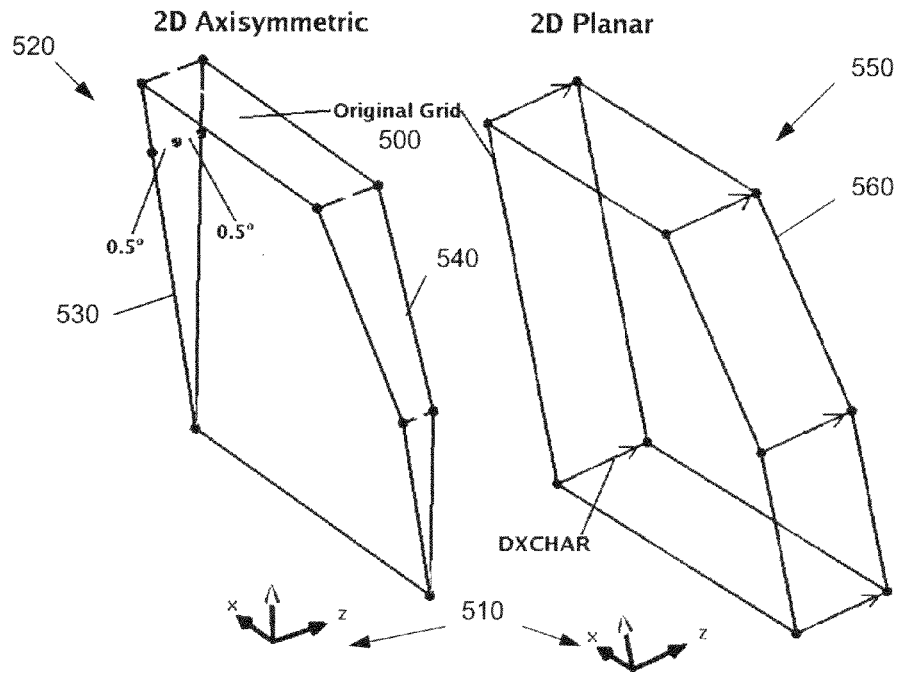
FIG. 4 is a tabular view of CFD solution variables.
FIG. 5 is an isometric view of grid extrusion geometries.

FIG. 4 presents a table 400 listing the eleven required variables stored in a data array within PISCES. The first column 410 presents the array position, and the second column 420 identifies the physical parameter. Thermal conductivity K is computed from the definition of Prandtl number Pr, which is dimensionless. The Prandtl number may be read from the CFD solution or may be set to a constant value by the user. CRAFT assumes that Prandtl number is a constant value of Pr=0.72 throughout the computational domain (as a reasonable approximation for air in the troposphere).

Conventional solutions from CRAFT were typically in the q-file format with two files, a "q" file and a "q3" file. The "q" file contains the non-dimensional values for density $\rho$, mass fluxes $\rho U$, $\rho V$, $\rho W$, and total energy E. The "q3" file contains the dimensional values for static pressure (atmospheres), static temperature (Kelvin), ratio of specific heats $\gamma$, Mach number M, and total energy E (Joules). If this type of solution format is used for input, the corresponding lines in segment 315 from ParticleInput.txt are:

| QFORM | | | | |
|---|---|---|---|---|
| !type | unformatted | iblank | multi-block | !for plot3D files |
| plot3d-q | true | true | true | |
| QNAME recomp.craft.q | | | | | to define plot parameters.

The CFD solutions are read and saved within PISCES for the computational domain. The non-dimensional "q" file data must be dimensioned for use in PISCES by scaling to a reference value, such as freestream conditions of the fluid medium. Values set in segment 330 of the main input file 300 for freestream density $\rho_\infty$ "RHOINF", freestream axial velocity $U_\infty$ "UINF", and freestream static pressure $P_\infty$ "PINF" are used as reference values for length, density, velocity and pressure, respectively. The non-dimensional density is multiplied by RHOINF; the values for $\rho U$, $\rho V$, and $\rho W$ are multiplied by (UINF/RHOINF); and the pressure is multiplied by PINF. The corresponding lines from the input file are:

!---Values for dimensionalizing grid and solution

XLINF 1.0 !length scale

!if solution values are dimensional enter 1.0

RHOINF 1.17156

UINF 347.97

PINF 101325.0 where the freestream values are defined by $\rho_\infty$=1.17156 kg/m³, $U_\infty$=347.97 m/s and $P_\infty$=101.325 kPa (=1 atm) for the example shown at segment 330.

A second type of PLOT3D solution file is a function file, which may contain any number of variables. If this type of solution format is used, the input file lines shown in segment 315, can be changed (from the CRAFT version) to:

| QFORM | | | | |
|---|---|---|---|---|
| !type | unformatted | iblank | multi-block | !for plot3D files |
| plot3d-fun | true | true | true | |
| QNAME recomp.craft.gfun | | | | | to alternatively define plot parameters.

Because the position of the variables within a function file may be varied, the user must specify which function file variable corresponds to each of the eleven PISCES variables as real numbers. This can be accomplished by defining either the function file variable number, or if the value is not available, by specifying an average value. The appropriate lines from the main input file are:

CFD_Solution_Values

!Position in data file of each variable (ignored for q files)

!rho uvel vvel wvel P(Pa) T(K) Mach gamma cp(J/(kg K)) mu(N/(s m^2)) Pr

| 1 | 2 | 3 | 4 | 5 | 6 | 7 | 8 | 9 | 10 | avg |
|---|---|---|---|---|---|---|---|---|---|---|

Average_CFD_Values !if nodal values are not in CFD solution

!rho uvel vvel wvel P(Pa) T(K) Mach gamma cp(J/(kg K)) mu(N/(s m^2)) Pr

| 0. | 0. | 0. | 0. | 0. | 0. | 0. | 1.33 | 1141. | 1.e-9 | 0.72 |
|---|---|---|---|---|---|---|---|---|---|---| where in the above example input lines, the variables numbered one through ten are read from the CFD data file, whereas the value for Prandtl number is set to the average value of Pr=0.72 (in air).

IX. Units: Dimensions for grid and, solution values, shown in segment 330 can be defined by local freestream parameters. Although the particle integration part of PISCES does not have a built-in system of units, the heat transfer and conduction models employ an enthalpy versus temperature dimensional relationship for the particle material. The curve representing this relationship used in PISCES provides enthalpy and temperature data in Système International d'Unités (SI) units. Therefore, the input CFD solutions and grid may preferably also be in SI units. However, a supplemental routine can provide the material properties in a different set of units for conversion. The main input file 300 contains input parameters for rescaling the CFD solutions as needed. These parameters are XLINF, RHOINF, UINF, and PINF, which are used as reference values for length, density, velocity and pressure, respectively. These parameters are described in more detail in sections VI and VIII.

Non-dimensional parameters employed for CFD include Prandtl number Pr, as introduced earlier, as well as additional non-dimensional parameters including Reynolds number Re, Nusselt number Nu and Biot number Bi. Prandtl number can be expressed as $Pr=(c\mu/\kappa)_g$ where c, $\mu$ and $\kappa$ correspond respectively to specific heat capacity, kinematic viscosity and thermal conductivity of the fluid medium. Prandtl number represents a ratio of momentum and thermal diffusion (and for many fluid applications can be approximated as a constant). Reynolds number can be expressed as $Re=\rho UL/\mu$, where $\rho$ is fluid density and L is a characteristic length, and represents a ratio of advection to diffusion that determines transition from laminar to turbulent flow. Nusselt number represents a ratio of conductive thermal resistance to convective resistance (both of the fluid medium) and depends only on Reynolds and Prandtl numbers. Biot number represents a ratio of conductive thermal resistance of a solid object in contact with a moving fluid to convective resistance of the fluid medium. For Bi<0.1, the lumped-mass approximation is considered appropriate.

X. Characteristic Length: In response to the CFD grid and solution being read by PISCES, a characteristic length for the grid, DXCHAR, is computed. The representative length is used for extruding a two-dimensional grid into a three-dimensional grid and for setting the initial time-step size to ensure a particle does not move through more than one cell during a single step. The characteristic length can be computed by searching through the entire CFD grid to find the cell with the smallest volume or area. The volume or area is computed for each cell, depending upon whether the grid is initially two-dimensional or three-dimensional, respectively. Upon determining the smallest volume (area), a radius for a sphere (circle) of equivalent volume (area) can be computed. This radius is then used as the characteristic length of the grid.

XI. Map 2D to 3D: PISCES computes particle motion in three-dimensional grids. Therefore, if the initial CFD solution is two-dimensional, the grid must be extruded into a three-dimensional grid of one cell width. Two-dimensional grids originally lie on the xy-plane. FIG. 5 illustrates examples of both types of extrusions from an original planar grid 500: axi-symmetric and planar, shown with respect to a Cartesian compass-rose 510 illustrating the orthogonal axes. The axi-symmetric grid 520 presents the original planar area 500 rotates ±0.5° about its axis of symmetry (along the x-axis) to form adjacent planes 530, 540. The two-dimensional planar grid 550 is extruded in the z-direction a distance of DXCHAR to form an adjacent, parallel planar grid 560.

XII. Triangulation of Structured Cell Faces: Integration of a particle's motion involves eventually passing the particle from one cell to an adjacent cell as determined in step 220. To track the particle motion through the grid, logic tests whether a particle has passed through a cell face as further described in section XVI. The logic tests whether the particle has passed through a defined plane in space. However, for hexahedral cells, each cell face is defined by four points. Because three points uniquely define a plane, four points may not be on a single plane and the cell face may be composed of a pair of intersecting planes.

Figures 6, 7:
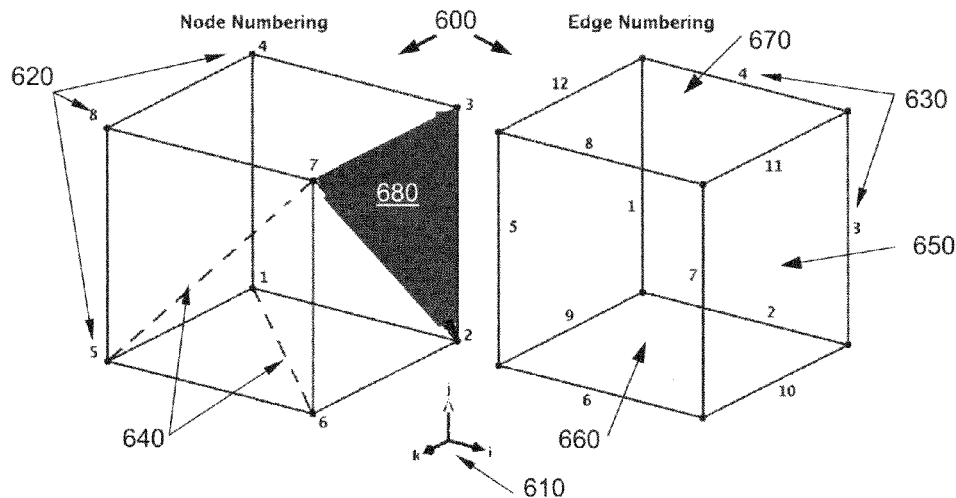
FIG. 6 is an isometric view of reference identification parameters for a grid cell.
FIG. 7 is a tabular view of cell parameter cross-reference information.

To solve this problem, each cell face is split into two triangles by constructing an imaginary line from corner to corner. Each cell is triangulated using a standard template, so the triangles in one cell face match one-to-one with the triangles on the adjacent cell face. FIG. 6 shows the three-dimensional geometry 600 corresponding to the logic for triangulating the cell faces with respect to a compass-rose 610. Boundaries of a rectangular prism can be characterized by node numbers 620 or by edge numbers 630 that connect nodes along the boundaries of each cell face. Nodes diagonally opposing each other on a face can be associated, by the imaginary diagonal lines 640. The nodes and/or vertices define the cell faces, the other ones being identified as face-2 650, face-4 660 and face-6 670. The diagonal line 640 between vertex-2 and vertex-7 divides face-2 into a pair of triangles, the upper one of which being shaded 680.

FIG. 7 provides a table 700 listing the detailed breakdown of triangles, nodes, cell faces, and face directions. The columns represent identification lists for the cell face 710, direction 720, subdividing triangle 730, vertices 740 and corresponding edges 750, as represented in the FIG. 6 cell geometry. The shaded triangle 680 corresponds to the second triangle of face-2 as indicated in the table 700 by the rows denoted by arrow 760.

Each vertex, diagonal, and edge corresponds to a single cell face. Thus, if a particle passes through one of these edges or vertices, PISCES only considers the particle as exiting the cell once. For example, vertex-7 associates in the FIG. 6 example) with face-2, face-4, or face-6. If a particle passes through this vertex, the code might count the particle as passing through all three faces. Counting the particle passage in this way would give an incorrect result when testing if a particle has left the cell. To preclude such adverse effect, the vertices and edges are assigned as identified in FIG. 7 by the table 700.

Figure 8:
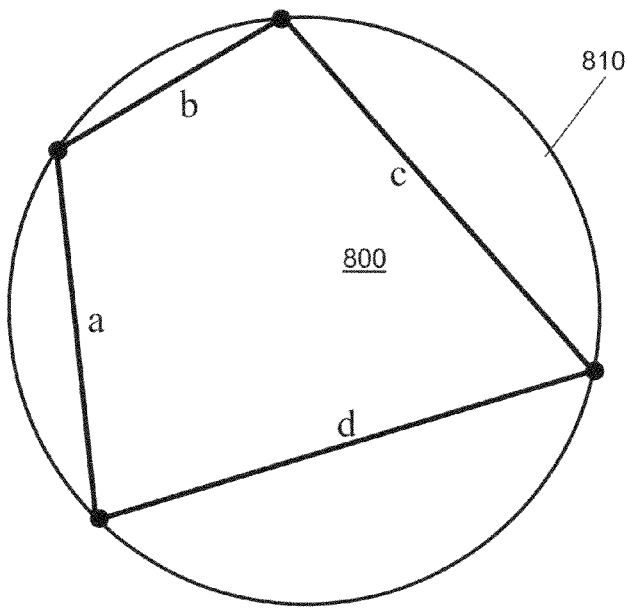
FIG. 8 is an elevation view of a cyclic quadrilateral for particle size characterization.

XIII. Computing Cell Face Areas: The area of a cell face is determined for both particle insertion calculations and computing fluxes to the wall (energy/area ratio). FIG. 8 shows a cyclic quadrilateral 800 with sides of lengths a, b, c, and d inscribed in a circle 810. PISCES computes the cell face area for a general quadrilateral using Brahmagupta's formula for the area of the cyclic quadrilateral. See http://mathworld.wolfram.com/BrahmaguptasFormula.html (Wolfram, MathWorld). The formula provides the area of the quadrilateral 800 having side lengths a, b, c, and d. The semi-perimeter s can be computed as:

$$s = \frac{a+b+c+d}{2} \tag{1}$$

so that the cell face area A can be determined as:

$$A = \sqrt{(s-a)(s-b)(s-c)(s-d)}. \tag{2}$$

XIV. Particle Sizing: The $Al_2O_3$ particles exit the nozzle in a wide distribution of sizes. Experiments have been conducted to measure the particle size distributions of many solid rocket motors. Investigators have derived complex relations to correlate the mean particle size to rocket motor and propellant characteristics. See R. Hermsen, "Aluminum Oxide Particle Size for Solid Rocket Motor Performance Prediction", *Journal of Spacecraft*, v. 18, 1981, pp. 483-490 for a widely accepted correlation expressed for mass-weighted average diameter $D_{43}$ as (for the units identified below):

$$D_{43} = 3.63044 D_t^{0.2932}(1-\exp(-0.0008163 \xi P_c \tau)), \tag{3}$$

where $D_t$ is the nozzle throat diameter (inches), is the $Al_2O_3$ concentration in the chamber (g-mol/100 g), $P_c$ is the chamber pressure (psia), and $\tau$ is the average chamber residence time (milliseconds or ms). The residence time is computed using the average chamber density and mass flow rate and the empty chamber volume when half the propellant is expended. The mass-weighted average diameter $D_{43}$ (microns or μm) can be defined for a continuous distribution as:

$$D_{43} = \frac{\int_0^{D_{max}} D^3 f(D) dD}{\int_0^{D_{max}} D^2 f(D) dD}, \tag{4}$$

where $f(D)$ is the continuous distribution function. Solutions to eqn. (3) were produced for the rocket motor of interest.

A log-normal size distribution is then used to represent the entire variation in particle sizes. Log-normal distributions generally arise when the quantity of interest (in this case, diameter) is dependent upon many multiplicative factors and is often used for particle size distributions. See C. Crowe, M.

Sommerfield and Y. Tsuji, *Multiphase Flow with Droplets and Particles*, CRC Press LLC, 1998. The distribution function $f(D)$ for characteristic particle size may be written as:

$$f(D) = \frac{1}{\sqrt{2\pi}\,\sigma D} \exp\left[-\frac{1}{2}\left(\frac{\ln D - \ln D_m}{\sigma}\right)^2\right], \quad (5)$$

where $\sigma$ is the standard deviation of the distribution and $D_m$ is the mean diameter within the distribution.

Figure 9:
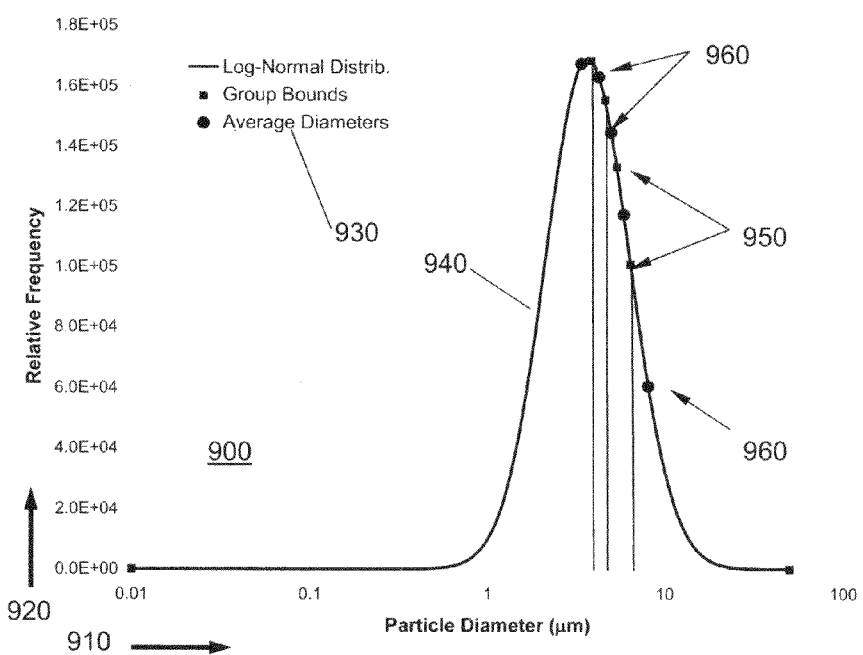
FIG. 9 is a graphical view of a frequency distribution plot by particle diameter.

FIG. 9 shows an exemplary distribution $f(D)$ defined in eqn. (5) using $D_m = 5\times 10^{-6}$ meters and a standard deviation of $\sigma=0.3$. The graph 900 relates the particle diameter (μm) 910 as the abscissa and relative frequency (log-normal) 920 as the ordinate with parameters identified by a legend 930. The solid curve 940 represents the continuous Gaussian distribution, which is normalized so that the area under the curve is unity. Points along the curve 940 include group bounds, identified as filled squares 950, and average diameters, identified as filled circles 960, to indicate close correlation.

In the particle code, the continuous distribution is represented by a discrete number of particle sizes, or particle groups. The user specifies the number of particle groups desired in the input file. In FIG. 9, the distribution is divided into five groups. The squares 950 identify the minimum and maximum diameter limits for each particle group. These diameter limits are determined by dividing the area under the distribution curve into equal area regions with one region for each group. For N groups, the limits $D_j$ may be determined from the integral equation:

$$\int_{D_{j-1}}^{D_j} f(D)\,dD = 1/N, \quad j=0,N, \quad (6)$$

where $D_0 = 0$, and $D_N \gg D_m$. Upon determining the limits of the N areas, the distribution is then integrated between each of the limits to determine a mass-averaged diameter for each group. In FIG. 9, the circles 960 indicate the five particle diameters used to represent the continuous distribution for this example.

XV. Particle Insertion: The number of physical particles flowing from an actual rocket motor can be very large. For example, for a small rocket motor such as the Sidewinder Mk 36, the $Al_2O_3$ component constitutes about 31% of the exhaust by mole fraction. This equates to particle mass flow $\dot{m}_{Al_2O_3}$ of about 8.3 g/s of $Al_2O_3$ flowing out of the motor during its ~5 second burn. The average particle size is $D_{avg} = 4.5\times 10^{-6}$ m. Because the density of $Al_2O_3$ is $\rho_{Al_2O_3} = 3970$ kg/m$^3$, the average particle mass $M_{pavg}$ is:

$$M_{Pavg} = \frac{4}{3}\left(\frac{D_{avg}}{2}\right)^3 \rho_{Al_2O_3} = 6.03\cdot 10^{-14}. \quad (7)$$

Dividing the total $Al_2O_3$ mass flow by the mass of an average particle gives the total number particles $N_{parts}$ (in particles per second):

$$N_{parts} = \frac{\dot{m}_{Al_2O_3}}{M_{Pavg}} = \frac{8.3\,\text{g/s}}{6.03\cdot 10^{-14}\,\text{kg/part}} = 138\cdot 10^9 \text{ parts/s}. \quad (8)$$

Because modeling such a large number of particles is unfeasible, a smaller representative number of particles are thus used for step 134. The number of particles in the model should be sufficiently large to ensure a good representation of the particle distribution but small enough to allow for reasonable computational times. A convergence study was conducted on a simple example case to determine both if the energy flux to the wall showed a converging behavior with increasing particles and to determine an approximate number of particles required. The results of this study can be seen in section XXIV and indicate that the number of particles should be in the range of hundreds to a few thousand to ensure good convergence of the solution. Larger computational domains may require more particles, but the simple study showed that the model can provide accurate convergence with a reasonable number of computational particles.

Particles are inserted in the CFD domain in one of two ways. The user may either specify the (i, j, k) bounds of a patch or specify which of the CFD boundary conditions is to be used as the flow inlet. The following lines from the input file control the particle insertion.

```
!---Particle insertion info
!Insert particles using a PATCH defined below or using BC file
PATCH    true
!If  (PATCH==FALSE), enter boundary condition for particle input
PBC  x-5
!If  (PATCH==TRUE), define particle insertion patch here
!    block#  imin, imax, jmin, jmax, kmin, kmax (node-centered)
PLOCS     1    1    1    1    10    1    2
``` where to select an inlet patch the user sets PATCH equal to "true" and specifies the block number and (i, j, k) minimum and maximum indices for the desired insertion patch. If a CFD boundary condition is used for particle input, the input line PATCH is set to "false" and the value PBC may be set to the desired boundary condition number. In the example above, PBC set to −5 indicates the particles are to be inserted along a CRAFT injection boundary.

In response to determining the insertion patch, the code subdivides the patch into an orthogonal grid and the particles are inserted at the cell centers of this grid for step 136. The user specifies the number of particle insertion points desired along the two orthogonal dimensions of the patch. PISCES automatically sets the larger number of insertion points along the longer direction. The user sets the number of insertion points by the following lines:

!number of particles along major and minor axes
PNUMS 10 2 where PNUMS specifies particle distribution within a cell. For the example values above, the insertion region is divided into an orthogonal grid of dimensions 10×2. The particles are inserted at the center of each of these cells. One particle is released for each particle mass group at each insertion point. For example, for five particle groups such that NPGROUP 5 !number of particle groups then five particles are released at each point for a total of one-hundred particles.

The particles may be inserted in equilibrium with the surrounding fluid medium or with a specified velocity and temperature in step 138. This option is controlled by the following lines:

!Equate particle props to local flow (true) or user input (false)
PEQUATE true
!Initial particle velocity vector (if PEQUATE==false)
PVINIT 10. 34. 0.
PTINIT 300.

where PEQUATE is set to "true" to equilibrate the particles to the surrounding flow and to "false" to initialize the particles to velocity PVINIT and temperature PTINIT.

XVI. Particle In-Cell Testing: In order to correctly predict the particle motion, the condition of the fluid surrounding the particle should be known. The fluid properties are determined by interpolation using the nodal properties of the cell in which the particle is located. Therefore, the identity of each cell should be determined for the particle at every time-step. In three dimensions, this involves several operations.

Figure 10:
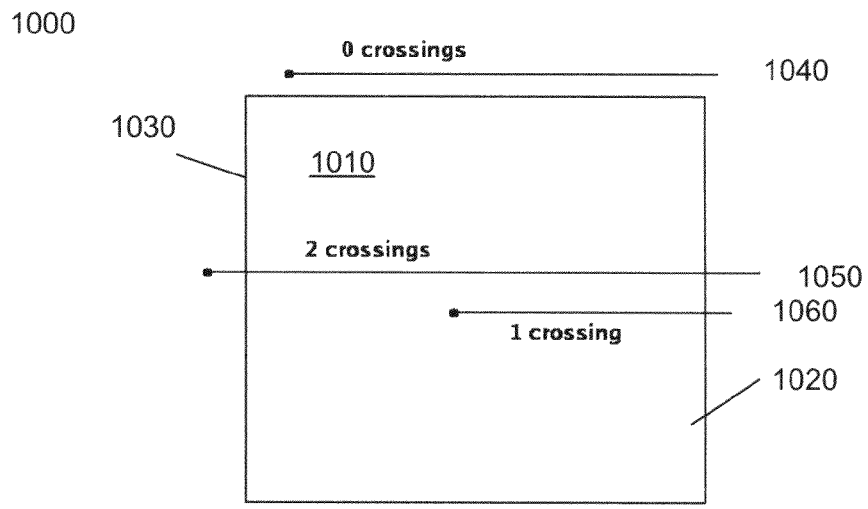
FIG. 10 is an elevation view of a grid cell with adjacent particles.

The fundamental technique to determine the particle's presence within a cell is to project a ray from the particle location to infinity and count the number of times the ray intersects a cell wall. An even number of intersections indicates the particle being outside the cell, while an odd number of crossings indicates the particle being inside. FIG. 10 illustrates this technique for a region 1000 containing a two-dimensional quadrilateral cell 1010 having vertical edges 1020, 1030. A first particle 1040 passing alongside the cell 1010 never crosses the cell's boundaries at either edge. A second particle 1050 enters the first edge 1020 and exits the second edge 1030. Thus, both first and second particles are outside the cell 1010. A third particle 1060 enters the first edge 1020 but does not cross the second edge 1030, and hence remains inside the cell 1010.

Figure 11:
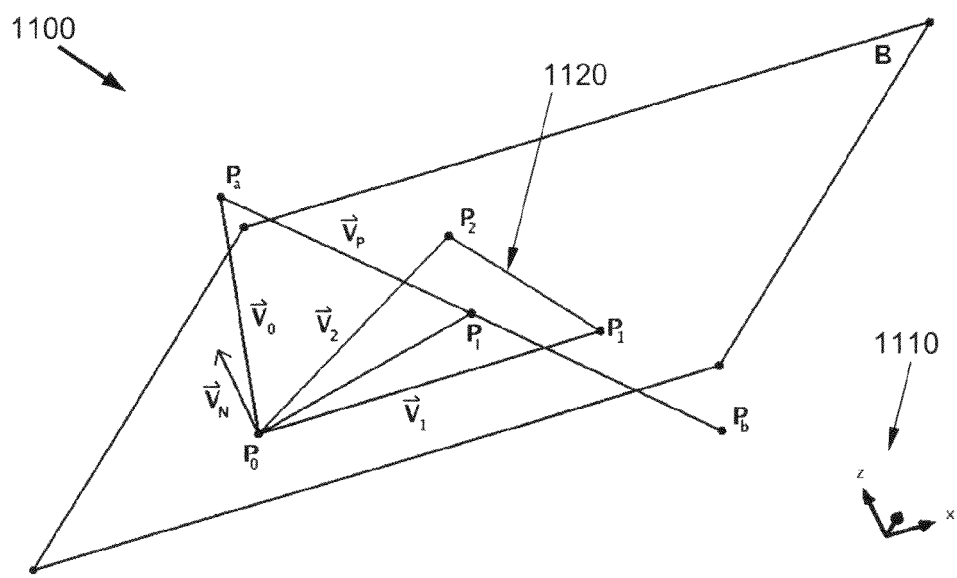
FIG. 11 is an isometric view of a vector crossing a plane defined by a triangle.

In PISCES, a line is projected from the particle position in the +y (lateral) direction a distance of 10*DXCHAR. Each face of the hexahedral cell must be tested to determine if the projected line intersects that face. Because the faces are triangulated (as shown in FIG. 6), this means that twelve triangles must be checked for intersection with the projected line. FIG. 11 illustrates a technique for testing if the projected line intersects a triangle. A region 1100 oriented in context of a compass-rose 1110 contains a plane B defined by three points $P_1$, $P_2$ and $P_3$ that define a triangle 1120. A particle travels along a vector line $\vec{V}_p$ starting at initial position denoted by point $P_a$ and ending at a final position denoted by point $P_b$.

The particle vector $\vec{V}_p$, from $P_1$ to $P_2$, must be tested to determine if it intersects or is parallel to plane B. In FIG. 11, vectors from the triangle point $P_0$ to the points $P_1$ and $P_2$ may be defined as:

$$\vec{V}_1 = P_1 - P_0$$

$$\vec{V}_2 = P_2 - P_0 \qquad (9)$$

The unit normal to the plane B may be computed as vector cross-products:

$$\vec{V}_N = \frac{\vec{V}_1 \times \vec{V}_2}{|\vec{V}_1 \times \vec{V}_2|}. \qquad (10)$$

The line $\vec{V}_p$ is parallel to the plane B if:

$$\vec{V}_N \cdot \frac{\vec{V}_p}{|\vec{V}_p|} = 0. \qquad (11)$$

If $\vec{V}_p$ is parallel to plane B, the point $P_a$ may either lie on or off the plane B. To determine if $P_a$ is on the plane, vector $\vec{v}_0$ is defined as:

$$\vec{v}_0 = \vec{P}_a - \vec{P}_0. \qquad (12)$$

If $\vec{v}_0$ is not perpendicular to $\vec{V}_N$ then:

$$\vec{V}_N \cdot \frac{\vec{V}_0}{|\vec{V}_0|} \neq 0, \qquad (13)$$

so that line $\vec{V}_p$ is parallel to plane B, point $P_a$ does not lie on plane B. Thus, there is no intersection of line $\vec{V}_p$ with plane B. Otherwise, if $\vec{v}_0$ and $\vec{V}_N$ are perpendicular, then point $P_a$ lies on plane B and $P_a$ may be considered the intersection point $P_I$. The next step is to determine if point $P_a$ lies within triangle 1120 defined by points $P_0$, $P_1$ and $P_2$.

Another possible configuration shown in FIG. 11 occurs if line $\vec{V}_p$ is not parallel to plane B, i.e., eqn. (11) does not equal zero. If the line and plane are not parallel, then there must be an intersection at point $P_I$. Again, the next step is to determine if the intersection point $P_I$ lies within triangle 1120. To determine the location of the intersection point $P_I$, the following parametric equation may be used:

$$P_I - P_0 = \vec{V}_0 + s\vec{V}_p. \qquad (14)$$

Because $P_I$ and $P_0$ both lay on the plane, taking the dot product of eqn. (14) with the normal vector $\vec{V}_N$ provides:

$$\vec{V}_N \cdot (\vec{V}_0 + s\vec{V}_p) = 0, \qquad (15)$$

which may be rearranged to:

$$s = \frac{-(\vec{V}_N \cdot \vec{V}_0)}{(\vec{V}_N \cdot \vec{V}_p)}. \qquad (16)$$

Using s from eqn. (16), the intersection point may be determined from:

$$P_I = P_a + s\vec{V}_p. \qquad (17)$$

To determine whether intersection point $P_I$ is within the triangle 1110 its position may be defined with the following equation:

$$P = P_0 + s_1 \vec{V}_1 + s_2 \vec{V}_2. \qquad (18)$$

Then eqn. (18) may be solved for the variables $s_1$ and $s_2$:

$$s_1 = \frac{(\vec{V}_1 \cdot \vec{V}_2)((P_1 - P_0) \cdot \vec{V}_2) - (\vec{V}_2 \cdot \vec{V}_2)((P_1 - P_0) \cdot \vec{V}_1)}{(\vec{V}_1 \cdot \vec{V}_2)^2 - (\vec{V}_1 \cdot \vec{V}_1)(\vec{V}_2 \cdot \vec{V}_2)} \qquad (19)$$

$$s_2 = \frac{(\vec{V}_1 \cdot \vec{V}_2)((P_1 - P_0) \cdot \vec{V}_1) - (\vec{V}_1 \cdot \vec{V}_1)((P_1 - P_0) \cdot \vec{V}_2)}{(\vec{V}_1 \cdot \vec{V}_2)^2 - (\vec{V}_1 \cdot \vec{V}_1)(\vec{V}_2 \cdot \vec{V}_2)}, \qquad (20)$$

for which if both $0 \leq s_1 \leq 1$ and $0 \leq s_2 \leq 1$, then $P_I$ is within triangle 1120 defined by points $P_0$, $P_1$ and $P_2$. Additional logic may be employed to ensure that the crossings at nodes or along edges are not counted more than once. The edges and nodes are defined as belonging to specific triangles on the hexahedral faces as shown in FIGS. 6 and 7.

XVII. Particle Drag: The drag force acting on a particle is determined at step 210 at each integration step to compute the particle acceleration. The drag coefficient is computed using a relation developed and extensively used in analyses of solid propellant rocket exhaust. See Crowe et al. The drag coefficient $C_D$ can be computed from the relation:

$$C_D = \qquad (21)$$
$$2 + (C_{D,0} - 2)\exp(-3.07\sqrt{\gamma g}\,(\text{Re}_r)M_r/\text{Re}_r) + \frac{h(M_r)}{\sqrt{\gamma}\,M_r}\exp\left(-\frac{\text{Re}}{2M_r}\right),$$

where $\gamma$ is the gas ratio of specific heats, $\text{Re}_r$ is the Reynolds number of the flow relative to the particle velocity, and $M_r$ is the relative Mach number (i.e., ratio of relative particle speed in freestream to the gas medium's speed of sound). The functions $g(\text{Re}_r)$ and $h(M_r)$ are defined as:

$$g(\text{Re}_r) = \frac{1 + \text{Re}_r(12.278 + 0.54\,\text{Re}_r)}{1 + 11.278\,\text{Re}_r} \qquad (22)$$

$$h(M_r) = \frac{5.6}{1 + M_r} + 1.7\sqrt{\frac{T_p}{T_g}}, \qquad (23)$$

where $T_p$ and $T_g$ are the particle and gas temperatures, respectively. The reference drag coefficient $C_{D,0}$ represents the value from the standard drag curve and is computed from:

$$C_{D,0} = \frac{24f}{\text{Re}_r} \qquad (24)$$

The $f$ in eqn. (24) is computed from the following correlation developed for a wide range of Reynolds numbers.

$$f = 1 + 0.15\text{Re}_r(1 + 4.25 \cdot 10^4 \text{Re}_r^{-1.16})^{-1}. \qquad (25)$$

Upon computing $C_D$ using eqn. (21), the drag force of the particle in the gas medium may be found from:

$$F_{Drag} = \frac{1}{2}\rho_g \pi \frac{D_p^2}{4}\|\vec{u}_g - \vec{u}_p\|, \qquad (26)$$

where $\rho_g$ is the gas density, $D_p$ is the particle diameter, $\vec{u}_g$ is the gas velocity vector, and $\vec{u}_p$ is the particle velocity vector.

XVIII. Particle Gas Heat Transfer: The particle heat flux to the walls depends upon the temperature of the particles colliding therewith. Hence, the model computes transient particle temperature. A heat transfer model within PISCES computes the transient heat transfer between the gas and the particle. Because PISCES uses a pre-computed CFD solution for the exhaust gas flow, the heat transfer to the particles is only one-way coupled (i.e., the gas flow is unaffected by the heat gained or lost to the particles). As a simplifying assumption, each particle can be treated as a lumped mass with a uniform temperature throughout.

The particles are further assumed to be smooth spheres. Although this assumption might not be strictly valid in all instances, the level of accuracy expected from the code was deemed not to justify the complexity of computing particle shapes and their corresponding heat transfer coefficients. The first step in computing the heat transfer is to determine the fluid properties surrounding the particle. This is accomplished using a three-dimensional linear interpolation scheme using the eight nodes surrounding the particle's current cell.

The Nusselt number Nu is computed using the following relation for flow over a sphere from Crowe et al.:

$$Nu = 2 + 0.6\sqrt{Re}Pr^{1/3} = 2 + 0.6\sqrt{Re}\sqrt[3]{Pr}, \qquad (27)$$

where Re is the local Reynolds number and Pr is the Prandtl number. Nusselt number represents a non-dimensional measure of the convection coefficient in step 210. Biot number Bi can be computed for thermal conductivity of the gas medium $\kappa_g = 0.083$ W/mK (air at ~1400K in watts-per-meter-Kelvin) using:

$$Bi = \frac{Nu \cdot \kappa_g}{\kappa_p} = \frac{Nu \cdot 83 \cdot 10^{-3}}{18}, \qquad (28)$$

where $\kappa_p = 18$ W/mK is the conductivity of the particle material, as a verification to determine the applicability of the lumped-mass assumption.

The heat transfer between the particle and gas is computed as a change in enthalpy. Because the particles may change phase throughout the simulation, the computation tracks particle enthalpy h instead of temperature to avoid temperature discontinuities encountered during phase changes. Using Nusselt number Nu to provide the convection magnitude, the enthalpy rate of change may be computed using:

$$\frac{dh}{dt} = \frac{12\kappa_g Nu}{2\rho_p D^2}(T_g - T_p), \qquad (29)$$

where $\kappa_g$ is the gas conductivity, $\rho_p$ is the particle density, D the particle diameter, $T_g$ is the gas temperature, $T_p$ is the particle temperature, and Nusselt number Nu is computed from eqn. (27).

To determine the particle temperature versus enthalpy, material property curves are used. These curves were adopted from the material information in the CFD code CRAFT for $Al_2O_3$. See CRAFT-Tech, *CRAFT CFD® User's Manual*, Version 2.06, 2006. One material property curve can be used for each phase. A routine within PISCES computes the specific enthalpy and specific heat values for the particle at a given temperature. A separate routine uses a bisection interpolation method with the material property curves to determine the particle temperature corresponding to a given enthalpy.

XIX. Particle Wall Interactions: PISCES treats walls in the computational domain as either slip or no-slip boundaries. Slip boundaries include slip walls and symmetry boundaries. Particle impacts to slip walls are treated as perfect reflections with no energy transfer. Particle impacts to no-slip walls transfer a finite amount of energy between the wall and the particle. For perfectly reflecting impacts, the unit vector normal to the cell face of the impact $\hat{V}_{NW}$ can be determined from the computational grid geometry. The particle velocity $\vec{V}_{PN}$ normal to the cell face is computed by the dot product:

$$\vec{V}_{PN} = \|\vec{V}_P \cdot \hat{V}_{NW}\|\hat{N}_{NW}, \qquad (30)$$

where $\vec{V}_P$ is the original particle velocity and the double-bars denote vector magnitude. Using the particle normal velocity, the new reflected velocity is:

$$\vec{V}_{P,new} = \vec{V}_P - 2\vec{V}_{PN}. \qquad (31)$$

Impacts from no-slip boundaries in step 245 involve calculation of the energy transferred between the particle and the wall. Energy transfers due to both the kinetic energy of the impact and heat conduction between the wall and particle during the contact time. The treatment of the impact derives from common impact models and the impact dynamics are controlled by the friction factor $C_f$ or FFAC, and the coefficient of restitution $C_r$ or CRES, set by the user in the main input file. See Crowe et al. for a resource on impact models.

The appropriate lines for these variables in the input file are (where the values are approximate values used for general simulations):

!---Particle/Wall Information
FFAC 0.2 wall friction factor
CRES 0.8 coefficient of restitution where the friction and restitution values define interaction between the particle and the wall.

The particle velocity may be decomposed into its components that are normal and tangential to the wall. The normal velocity after the impact is controlled by the coefficient of restitution and may be found simply from:

$$\vec{u}_{p,n,2} = C_r \cdot \vec{u}_{p,n,1} \tag{32}$$

where $\vec{u}_{p,n}$ is the component of the particle velocity vector normal to the wall and the subscripts "1" and "2" refer to the states before and after the wall impact, respectively.

The tangential velocity component is affected by friction during the impact. To determine the frictional effects, two ratios are computed as:

$$R_1 = \frac{2}{7 \cdot C_f(1+C_r)} \tag{33}$$

$$R_2 = \frac{\|\vec{u}_{p,n,1}\|}{\|\vec{u}_{p,t,1}\|}, \tag{34}$$

such that for $R_2$ greater than $R_1$, the post-impact tangential velocity is:

$$\vec{u}_{p,t,2} = \frac{5}{7}\vec{u}_{p,t,1}. \tag{35}$$

Otherwise, the post-impact tangential velocity is:

$$\vec{u}_{p,t,2} = (\|\vec{u}_{p,t,1}\| - C_f(1+C_r)\|\vec{u}_{p,n,1}\|)\frac{\vec{u}_{p,t,1}}{\|\vec{u}_{p,t,1}\|}. \tag{36}$$

The new particle velocity vector may then be found by adding the new normal and tangential components. The change in kinetic energy per unit mass $\Delta ke$ is then computed using the old and new velocity vectors:

$$\Delta ke = \frac{1}{2}(\vec{u}_{p,1} \cdot \vec{u}_{p,1} - \vec{u}_{p,2}\vec{u}_{p,2}). \tag{37}$$

The quantity of energy converted to heat within the particle can be treated as a function of the friction coefficient $C_f$ or FFAC. Therefore, the particle enthalpy $h_p$ increases during the impact by the amount:

$$h_{p,2} = h_{p,1} + C_f \cdot \Delta ke, \tag{38}$$

where the subscripts "1" and "2" refer to the states before and after the wall impact, respectively.

The remainder of the energy can be added to the total energy flux to the wall at that cell. The overall total energy flux to a given cell wall face from particle impact energy must be summed over all the impacts in the simulation and may be written as:

$$E_w = \sum_i (\Delta ke)_i m_{p,i}(1 - C_f), \tag{39}$$

where $m_{p,i}$ is the mass of each "i" particle.

Figure 12:
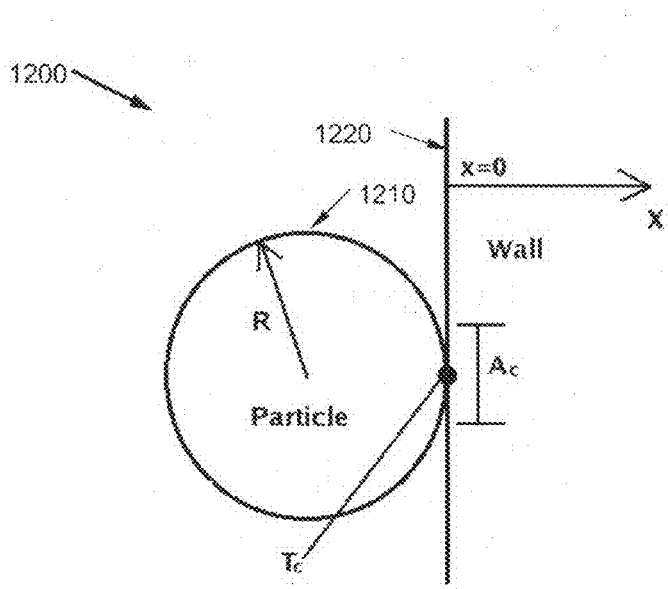
FIG. 12 is an elevation view of an idealized particle contacting a wall.

XX. Heat Conduction: Conductive heat transfer between the particle and the wall is modeled as the transfer of heat between a finite body and a semi-infinite plate. See F. P. Incropera and D. P. DeWitt, *Fundamentals of Heat and Mass Transfer* 3/e, John Wiley & Sons Inc., 1990. FIG. 12 illustrates the geometry of the heat transfer model. There are several assumptions used to develop this model. The assumptions are:

(1) The particle temperature is uniform (the particle's thermal time constant is very small and hence negligible compared to the wall's);

(2) The wall is a semi-infinite solid with a uniform temperature equal to the wall material's fail temperature; and (3) The particle-wall impact may be treated as an impact between two spheres with the radius of one sphere much larger than the radius of the second.

In particular, FIG. 12 shows a cross-sectional geometry 1200 of an idealized spherical particle 1210 physically contacting a solid wall 1220. The particle 1210 can be characterized by radius $R_p$. The wall 1220 extends linearly in the x-direction of thickness starting from the outer surface at x=0. The effective region of conduction can be characterized by contact area $A_c$ having a corresponding contact temperature $T_c$, which in the absence of an independent thermal source would provide a value between the bulk temperature of the particle 1210 and the temperature of the wall surface 1220.

The time over which conduction can take place is the time the particle 1210 and wall 1220 are in contact. The contact time $t_c$ may be determined from a treatment of the impact between two solid spheres. See S. P. Timoshenko and J. N. Goodier, *Theory of Elasticity* 3/e, McGraw Hill, 1934, p. 420. If one sphere has an infinite radius, the equations provide a first-order estimate of a sphere-wall impact. This contact time can be expressed as:

$$t_c = \frac{2.94}{u_i}\left(\frac{5}{4}\frac{m_p u_i^2}{n}\right)^{2/5} = 3.21\sqrt[5]{m_p^2 n^{-2} u_i^{-3}}, \tag{40}$$

where $u_i$ is the impact velocity and $m_p$ is the particle mass. The constant n (as a function of particle radius and material structural parameters) is defined as:

$$n = \frac{4}{3\pi}\frac{R_p^{1/2}}{(k_p + k_w)}, \tag{41}$$

where $R_p$ is the particle radius. The constants $k_p$ and $k_w$ are material property ratios for the respective particle and wall, the ratio defined as:

$$k = \frac{1-v}{\pi E}, \tag{42}$$

where v and E are the material's Poisson's ratio and Young's modulus, respectively of the material property ratio k.

The contact area $A_c$ is defined as the maximum contact area between the particle and wall during the impact. The contact area actually varies from zero to the maximum and back to zero, but for this approximation, the maximum value is assumed for the entire contact interval. To determine the maximum contact area, the maximum surface deflection is found from:

$$d_{max} = \left(\frac{5}{4}\frac{m_p u_i^2}{n}\right)^{2/5} = 1.09 \sqrt[5]{m_p^2 u_i^4 n^{-2}}, \quad (43)$$

where n is defined as in eqn. (41). The maximum impact pressure may then be calculated using:

$$P_{max} = \frac{4}{3\pi}\frac{1}{(k_p+k_w)}(d_{max}^3 R_p)^{1/2} = \frac{4}{3\pi}\frac{\sqrt{d_{max}^3 R_p}}{k_p+k_w}. \quad (44)$$

With the maximum pressure $P_{max}$ known, the maximum contact radius is:

$$r_{c,max} = \sqrt[3]{\frac{3\pi}{4}P_{max}(k_p+k_w)R_p} \quad (45)$$

and the corresponding contact area may be computed using this maximum radius as $A_c = \pi r_{c,max}^2$.

Solving for the amount of heat transferred to the wall and the subsequent particle temperature change is an iterative process. The total contact time $t_c$ from eqn. (40) may be divided into ten substeps in step 260 to maintain the stability and accuracy of the heat transfer calculation. A conduction time-step can be in this example defined as:

$$dt_{c,step} = \frac{t_c}{10} = 0.321\sqrt[5]{m_p^2 n^{-2} u_i^{-3}}, \quad (46)$$

where $dt_{c,step}$ is the individual time-step used for the conduction calculation.

The contact temperature $T_c$ may be computed using:

$$T_c = \frac{(\kappa\rho c)_p^{1/2}T_p + (\kappa\rho c)_w^{1/2}T_w}{(\kappa\rho c)_p^{1/2}+(\kappa\rho c)_w^{1/2}} = \frac{T_p\sqrt{(\kappa\rho c)_p}+T_w\sqrt{(\kappa\rho c)_w}}{\sqrt{(\kappa\rho c)_p}+\sqrt{(\kappa\rho c)_w}}, \quad (47)$$

where $\kappa$, $\rho$ and c represent the thermal conductivity, density, and specific heat, respectively. The subscripts "w" and "p" refer to the respective wall and particle materials. With $T_c$ known, the heat flux $q_w''$ to the wall 1220 may be computed from:

$$q_w'' = -\kappa_w\frac{\partial T_w}{\partial x}\bigg|_{x=0} = \frac{\kappa_w(T_c-T_{w,0})}{\sqrt{\pi\alpha_w(t+dt_{c,step}/2)}}. \quad (48)$$

where $T_{w,0}$ is the initial temperature of the wall at the particle impact and t is the time from the impact. The flux $q_w''$ is therefore evaluated at the time halfway through each conduction time-step. The thermal diffusivity $\alpha$ for a material is expressed as:

$$\alpha = \frac{\kappa}{\rho c}. \quad (49)$$

The energy to the wall for this substep is:

$$E_w = q_w'' A_c dt_{c,step}. \quad (50)$$

The change in particle enthalpy for this substep is:

$$dh_p = -\frac{E_w}{m_p} \quad (51)$$

$$= -\sqrt{\rho c\kappa\pi}\, r_{c,max}^2(T_c-T_{w,0})\frac{dt_{c,step}\sqrt{t+dt_{c,step}/2}}{m_p(t+dt_{c,step}/2)},$$

where $m_p$ is the mass of the particle. The new particle temperature may be determined in step 230 from the enthalpy versus temperature curve. This process, with eqns. (47) through (51), repeats for all ten substeps. The total energy imparted to the cell wall in step 170 is then the total of $E_w$ from each substep for each particle impact and may be written as:

$$E_{tot,c} = \sum_i\left(\sum_j E_{w,i,j}\right), \quad (52)$$

where the inner summation sums over all "j" substeps and the outer summation sums over all the "i" particle impacts in the simulation.

XXI. Integrating Forward in Time: A particle's state variables are integrated in time in several steps. CRAFT employs implicit iteration schemes with finite-volume discretization. First, the fluid properties at the particle location are determined from the CFD solution. The fluid properties are interpolated from the eight nodes that defined the particle's current cell using a linear interpolation scheme applied to three dimensions. With the fluid properties known, the current relative Reynolds number, drag force, heat transfer coefficient (from Nusselt number), and acceleration (from velocity) can be computed.

A first-order integration may be used to compute the particle's new location and temperature. The time-step size for this initial integration is computed to ensure the particle does not travel multiple cells in a single time-step. The step size is written as:

$$dt = \frac{dx_{char}}{\|\vec{V}_{p,1}\|}, \quad (53)$$

where $dx_{char}$ is the characteristic length of the grid and $\|\vec{V}_{p,1}\|$ is the particle's velocity magnitude at the start of the current step.

The first-order time integration provides a particle position at the end of the step. The code then determines at step 220 whether the particle remains in the original cell. If the particle has not left the cell at step 230, that time-step is concluded at step 265. The new values for particle position, velocity and enthalpy, and temperature may be saved as the current values and the program continues to the next time-step for that particle. If the particle is no longer within the original cell at step 225, the code determines through which cell wall the particle passed and the coordinates of the point where the particle intersected the wall at step 250. A linear interpolation may determine the time required for the particle to move from its original position to the intersection point at step 235. The first-order time integration is then used to integrate from the particle's original state to the wall intersection at step 245. The particle state variables are updated to the values at this temporary position at step 230.

The code then predicts whether the particle moves into a new cell or impact a wall at step 240. If the cell face corresponds to a wall boundary condition, the wall impact effects are computed at step 245 to determine a new particle state as described in section XIX. If the particle is moving into a new cell, the code determines the correct block and cell at step 250. After determining the new cell or computing the wall impact, the time integration continues. A new time-step size $dt_b$ may be computed at step 260 as the time difference between the initial time-step size dt and the time to the cell face intersection $dt_{to\_face}$:

$$dt_b = dt - dt_{to\_face}. \tag{54}$$

The time integration scheme is repeated to step 210 to predict the particle location at the end of the overall time-step dt. The scheme may be repeated as needed to compute many wall impacts or cell-to-cell movements. Once the total integrated time of all the iterations equals the original overall time-step dt, the time integration for that particle is considered complete for that step 162. The particle state variables are updated to the final values at step 163.

The time integrations continue for each particle until satisfaction of at least one of three criteria: Integrations stop once the particle exits the domain through an outflow boundary condition. A particle's integration also stops if the total time of the simulation, set in the input file 300, is exceeded. Finally, if the particle's properties have converged to steady-state, the time integration halts for that particle.

XXII. Test for Overall Convergence: At the end of each overall time-step, the particle state variables are tested for overall convergence of the particle motion. A residual is computed as the $l_2$-norm of the difference between the state variables at the current and previous time-steps. The residual equation can be expressed as:

$$R_\varepsilon = \left( \sum_{i=1}^{3} (V_{p,i} - V_{p,old,i})^2 \right)^{1/2} = \sqrt{\sum_{i=1}^{3} (V_{p,i} - V_{p,old,i})^2}, \tag{55}$$

where summing over the index "i" sums the three coordinate directions. If the overall residual is less than an epsilon value of $1.0 \times 10^{-5}$ (that represents a computational tolerance value) then the particle is assumed converged and the integration is stopped for that particle.

XXIII. Output: Data are output from PISCES in three files. All three files are written in Tecplot format for expedient post-processing using Tecplot®. The output data files include the original CFD grid and solution at step 120, the particle motion at step 166 and the wall flux impact data at step 180. The CFD grid and solution are written to a new file readable by Tecplot® so the user may view the CFD and particle solutions using the same post-processing program. The output 340 of the CFD solution is controlled in the main input file 300 with the following lines:

!Original steady-state CFD data
FCFD true tec_cfd.plt where FCFD is a Tecplot flag.

Writing the CFD solution to the data file "tec_cfd.plt" may consume much time for large computational domains. Therefore, for a given problem, the user may want to write out the CFD solution only once. Afterwards, the user may change the "true" value to "false" for the FCFD term in the input file 300 to skip (the repeat of) the CFD solution. The particle-motion data are written to a separate file in Tecplot format. Each particle is written as a separate zone and may be plotted as individual points or lines showing the particle paths. The output 330 sets the file name in the main input file 300 with the following lines:

!Time dependent solution data
FOUTU final_out.plt where FOUTU is an output plot flag.

The third output file contains the data from particle-wall impacts. All the boundaries defined as walls in the boundary condition file are output in this file. The computed data written to this file include the cell wall areas, the thermal energy imparted to the cell walls, the kinetic energy imparted to the cell walls, and the number of particle impacts on each cell wall. The output 330 sets file name in the main input file 300 with the following lines:

!Final wall data
FWALLS wall.plt where FWALLS is an output wall impact flag.

Figure 13:
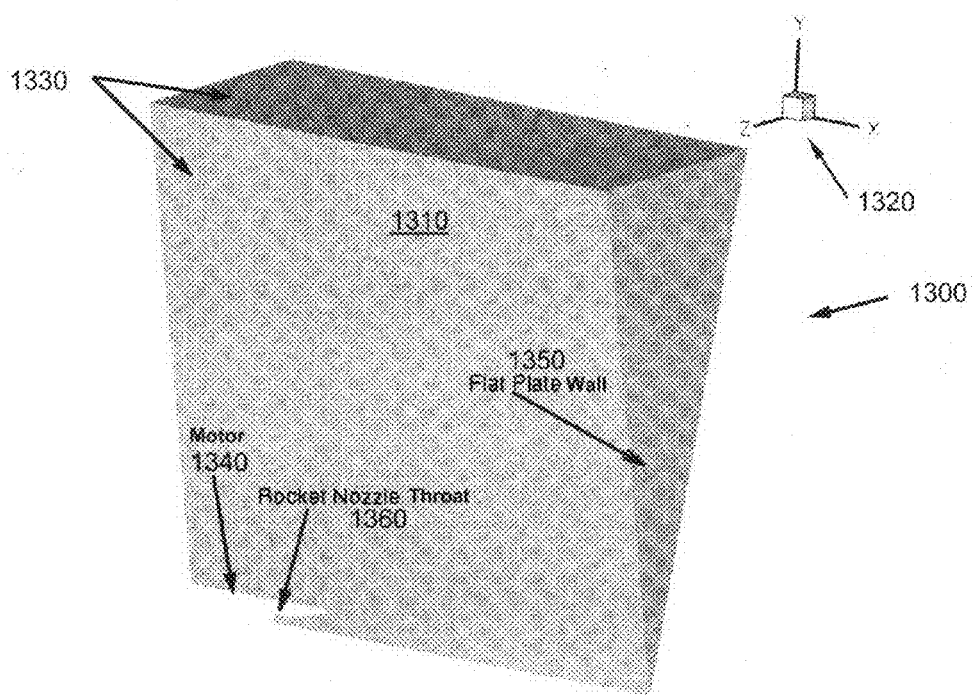
FIG. 13 is an isometric view of an example region for analysis.

XXIV. Example—Sidewinder Erosion Test: A set of experiments was conducted to compare the erosion characteristics of several ablative materials. Samples of each ablative were mounted vertically on a flat plate. A Mk 36 Sidewinder rocket motor was mounted at a standoff distance from the plate and ignited with post-test measurements recording the extent of ablative erosion. This configuration was used as a test case in the development of PISCES. FIG. 13 shows an isometric view 1300 of the three-dimensional domain 1310 for a rocket nozzle impinging against a flat plate (e.g., a wall) oriented with respect to a three-dimensional compass-rose 1320. The domain 1310 possesses an axi-symmetric geometry characteristic of the grid extrusion 520. Free boundaries 1330 represent surfaces substantially parallel to the freestream direction and thus experience minimal flow there-across. The solid boundaries are indicated by a rocket nozzle 1340 and a flat plate 1350. The mass injection from the rocket nozzle 1340 that generates a plume begins at the throat 1360.

FIG. 14 illustrates a color contour plot 1400 showing example velocity results in elevation view (i.e., in the x-y plane) of an axi-symmetric geometry of the plume from the rocket nozzle impinging against the flat plate. The abscissa 1410 (x-direction) along the motor axis of symmetry is orthogonal to the ordinate 1420 (y-direction) extending radially from the motor axis. A legend 1430 presents the ranges of velocities shown, from freestream defaulting at 200 meters-per-second (m/s) up to a maximum in the plume of 2800 m/s. The computational domain is shown with labels for the rocket nozzle 1440 and the flat plate 1450. A converged CFD solution was also used as input to PISCES. The contours shown in FIG. 14 are of the computed fluid velocity magnitude. The two-dimensional computational domain and solution are read by PISCES and mapped into a three-dimensional model, as described in sections VII-VIII.

Figure 15A:
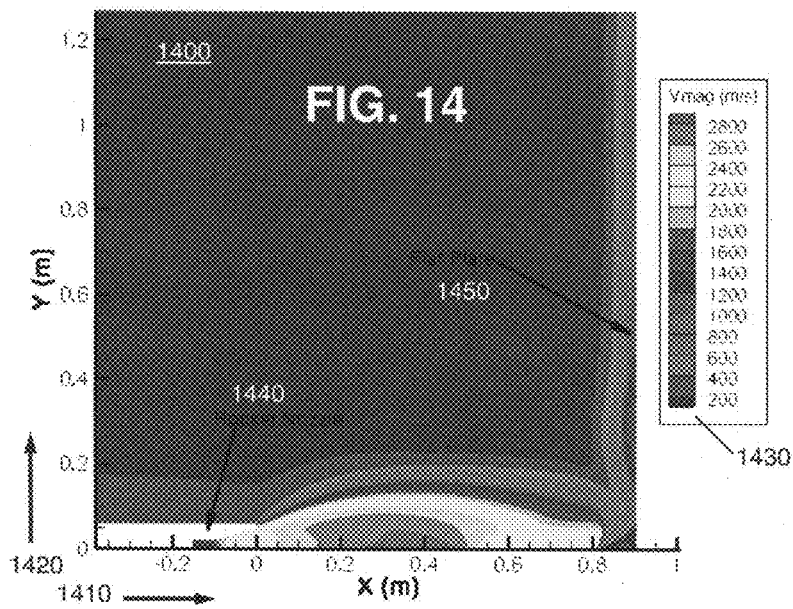
FIG. 15A is an elevation view of a color line plot for particle temperatures.
Figure 15B:
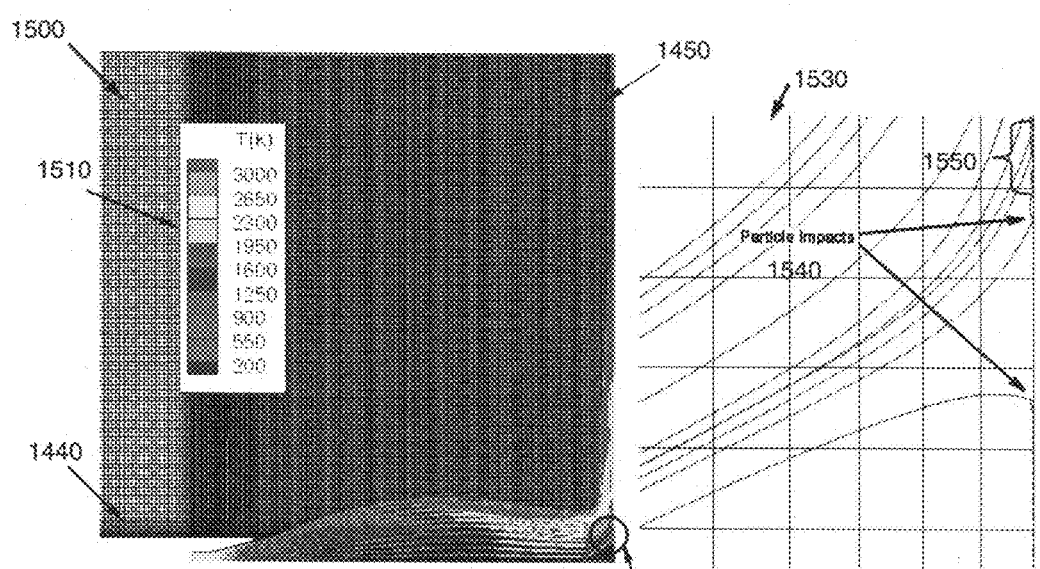
FIG. 15B is an expanded view of a detail, from FIG. 15A.

Particles were inserted into the flow at the nozzle throat, and the particle motion was integrated through the domain. FIG. 15A plots the particle tracks in elevation view 1500. Each line represents the motion of a single computational particle, and the lines are colored to correspond to the particle temperature shown in legend 1510 ranging from 200K to 3000K. The particles loose heat as they exit the nozzle 1440 and move towards the wall 1450. As the particles approach the wall 1450 such as within the circle 1520, their temperatures increase as they pass through a high-temperature region caused by a standing shock created by the gas impinging the wall 1450. FIG. 15B shows an expanded view 1530 of the particle paths in the region near the wall, indicated by the circle 1520 to reveal particle impacts 1540 and rebounds 1550.

Figure 16:
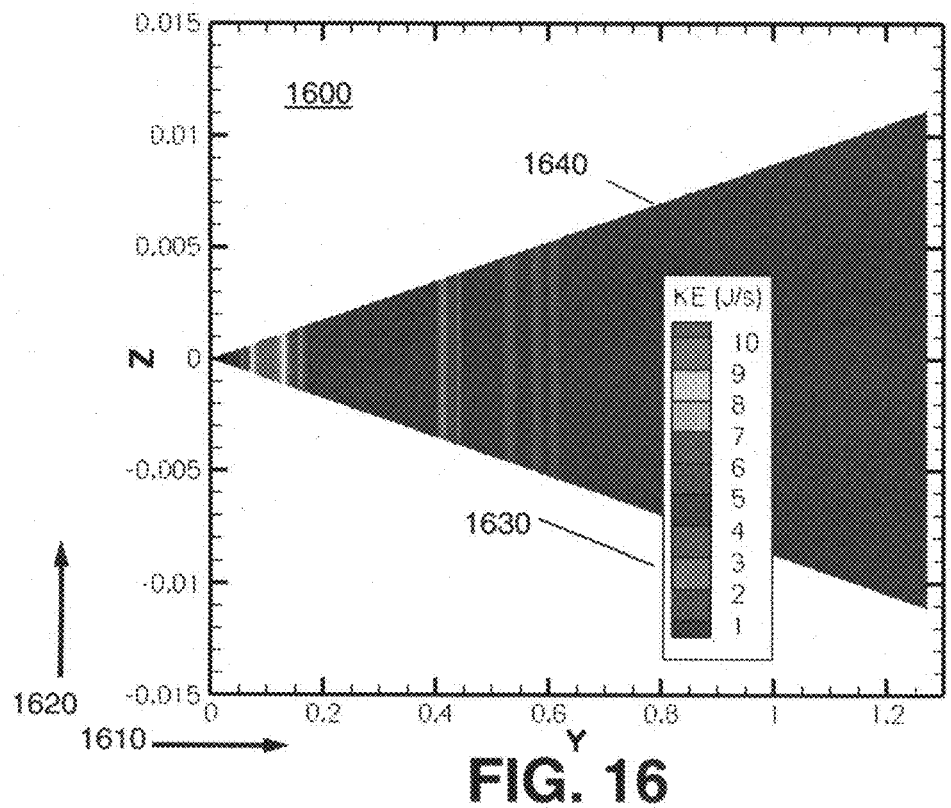
FIG. 16 is an elevation view of a contour plot for kinetic energy.

Each particle impact imparts a finite amount of kinetic energy to the cell face. The energy imparted by a single computational particle is multiplied by the number of real particles it represents. Once the motion of all the computational particles is computed, the total imparted energy can be summed for each cell face and written to a data file. FIG. 16 illustrates a plot 1600 of the total kinetic energy imparted to each cell face along the flat plate or wall, which represents the only surface of interest in this example. The abscissa 1610 and ordinate 1620 correspond to the y and z directions, respectively radially and angularly along the wall. The legend 1630 scales the kinetic energy from one-to-ten Watts (1-10 J/s). The plotted region 1640 shows concentrated impacts at 0.02<y<0.05. The imparted thermal energy from particle conduction can be output, as well as the area of the cell faces. Dividing the energy to the wall by the cell face area, the energy flux (W/m$^2$) can be determined for each cell.

Figure 17:
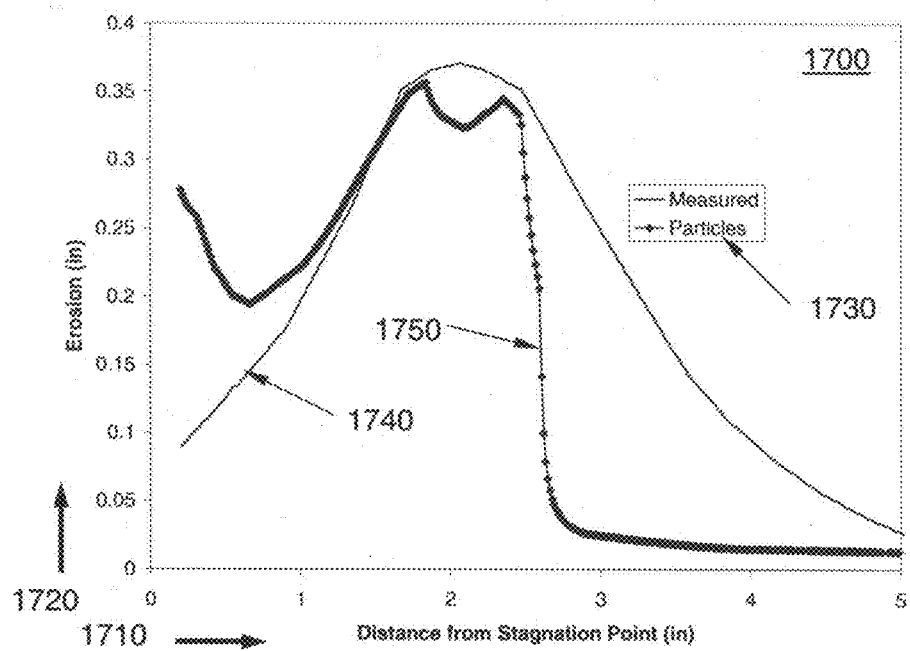
FIG. 17 is a graphical view of erosion versus distance from stagnation point.

FIG. 17 shows a graph 1700 plotting predicted erosion using the computed fluxes to the surfaces. Distance from the stagnation point represents the abscissa 1710 and erosion depth represents the ordinate 1720 (both values in inches). The legend 1730 identifies the line 1740 for measured data and connected points 1750 for predicted erosion 1750 based on particles. The thermal energy distribution was also computed for this case. The combined energy was correlated to test data to determine the erosion due to the particle effects.

Figure 18A:
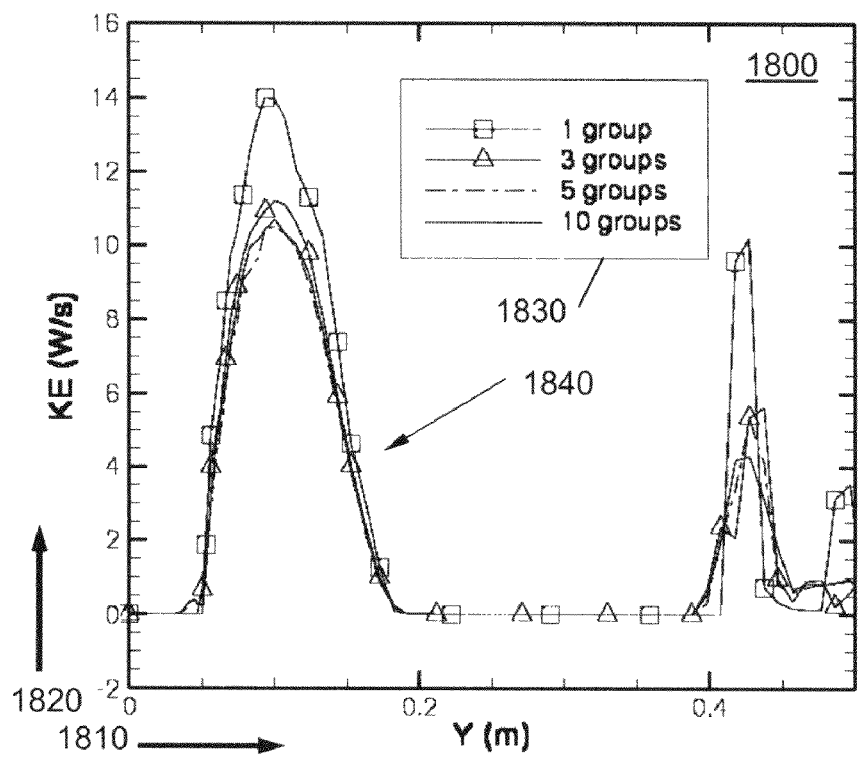
FIGS. 18A and 18B are graphical views of kinetic energy comparing particle quantities.

The user may specify the number of computational particles to use to represent the real system and how many particle groups are used to represent the real distribution of particle sizes. Increasing the number of particles or particle groups should increase the accuracy of the predictions. The calculated energy to the surfaces should become a smoother function with increased fidelity. To test the convergence of the solution with increasing particle groups, the Sidewinder model was calculated using one, three, five and ten particle groups. FIG. 18A illustrates a graph 1800 plotting the energy flux along the flat plate 1450 for all four cases. The plate's y-axis represents the abscissa 1810 and kinetic energy represents the ordinate 1820, with the legend 1830 identifying the lines 1840 by the particle groups. Increasing the number of particle groups provides a smoother distribution of the energy to the wall due to the smoother representation of the distribution of particle sizes.

Figure 18B:
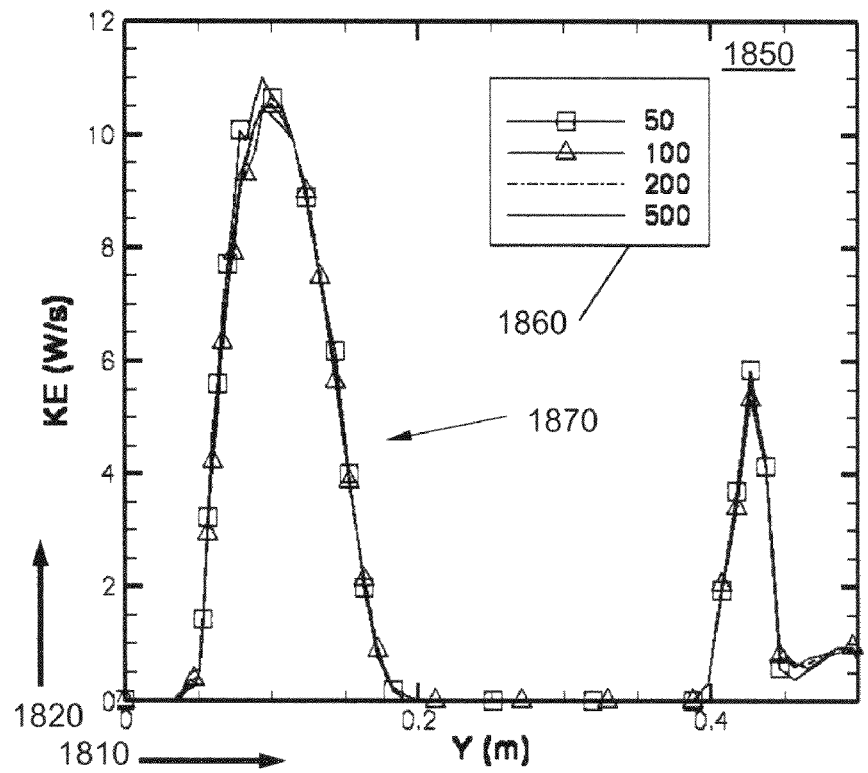

A second convergence test was also conducted to ensure a converging prediction with increasing numbers of injected particles. FIG. 18B shows a graph 1850 with the predicted kinetic energy imparted to the surface, calculated with 50, 100, 200, and 500 particles. (The same abscissa and ordinate apply, albeit with alternate domains.) The legend 1860 identifies the lines 1870 by the number of particles. The predictions quickly converge to a smooth solution. Therefore, the converged solution can be independent of the actual number of particles and groups used.

XXV. Results Summary: The PISCES code was developed to improve the predictions of ablative erosion in Navy missile launchers due to rocket exhaust with particles. PISCES uses a converged CFD solution of the gas dynamics within the launcher. A representative number of particles are inserted into the computational domain to model the motion of all the particles within the rocket exhaust. The particle motion is integrated in time to determine the path of each particle and the interactions between the particle and the launcher surfaces. The particles and gas are "one-way" coupled. The pre-computed gas flow field affects the particle motion, but the particles have no effect on the gas flow field. The kinetic and thermal energy imparted to the surfaces from each particle are computed. The PISCES final result provides the total energy flux to the launcher surfaces from all the particles. The energy flux may then be used to predict the extent of ablative erosion on all the surfaces.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for predicting thermal energy transfer from an entrained particle to a wall surface, said entrained particle being incorporated within a computational fluid dynamics (CFD) model of a flow scenario, said method comprising:
   generating grid geometry for the CFD model to form a plurality of finite element cells, each cell of said plurality of finite element cells having a characteristic cell size;
   establishing initial and boundary conditions for the flow scenario within the CFD model;
   determining a characteristic particle size of the entrained particle;
   inserting the particle into a first cell of said plurality of cells at an initial location;
   initializing physical conditions of the particle as a particle state;
   calculating a time-step based on said cell size and flow velocity;
   integrating state change in said particle state over said time-step in said first cell;
   computing collision effect from the particle to the wall surface in response to the particle crossing a face of said first cell, such that said face constitutes the wall surface; otherwise
   locating the particle either in a second cell adjacent to said first cell in response to the particle crossing said face, or else in said first cell, further including:
      projecting a vector from the particle location to extend beyond said first cell, and
      counting instances that said vector intersects said face, such that the particle remains in said first cell for odd instances, and otherwise outside said first cell for even instances;
   updating said particle state with said state change for end of said time-step in response to the particle remaining in said first cell;
   repeating said integrating through updating operations with said second cell being assigned as said first cell in response to the particle crossing said face of said first cell until reaching end of said grid geometry; and
   quantifying energy flux to the wall surface from collision by the particle.

2. The method according to claim 1, wherein said particle state includes at least one of velocity, drag force, temperature and enthalpy.

3. The method according to claim 1, wherein said integrating operation further comprises:
   adding kinetic effect from the particle to the wall surface such that wall energy $E_w = \Sigma_i (\Delta ke)_i m_{p,i}(1-C_f)$, where $\Delta ke$ is kinetic energy change per unit mass of the particle, $m_{p,i}$ is mass of the particle labeled "i" summed over all of a plurality of particles, and $C_f$ is friction coefficient of the particle.

4. The method according to claim 1, wherein said computing operation further comprises:

calculating heat flux to said wall surface at each substep such that wall energy $E_w = q_w'' A_c dt_{c,step}$, where heat flux $q_w''$ varies with material thermal parameters, conduction time-step and temperature difference between particle at contact and initial wall, contact area $A_c$ is based on impact depth, and conduction time-step $dt_{c,step}$ is a portion of contact time based on impact velocity, particle mass, particle radius and material structural parameters.

5. The method according to claim 1, wherein said updating operation further includes:

revising said time-step to equal a characteristic length of said grid geometry divided by velocity magnitude of the particle.

6. The method according to claim 5, wherein said the time-step is defined as:

$$dt = \frac{dx_{char}}{\|\vec{V}_{p,1}\|},$$

where $dx_{char}$ is a characteristic length of said grid geometry, and $\|\vec{V}_{p,1}\|$ is velocity magnitude of the particle to preclude the particle from traveling across multiple cells in one said time-step.

* * * * *